(12) United States Patent
Jogdand et al.

(10) Patent No.: US 10,576,575 B2
(45) Date of Patent: Mar. 3, 2020

(54) THREAD CONNECTION FOR A TORCH SYSTEM

(71) Applicant: Hypertherm, Inc., Hanover, NH (US)

(72) Inventors: Harshawardhan Jogdand, Lebanon, NH (US); Stephen M. Liebold, Grantham, NH (US); Nicholas A. Sanders, Enfield, NH (US)

(73) Assignee: Hypertherm, Inc., Hanover, NH (US)

( * ) Notice: Subject to any disclaimer, the term of this patent is extended or adjusted under 35 U.S.C. 154(b) by 976 days.

(21) Appl. No.: 15/023,258

(22) PCT Filed: Sep. 19, 2014

(86) PCT No.: PCT/US2014/056546
§ 371 (c)(1),
(2) Date: Mar. 18, 2016

(87) PCT Pub. No.: WO2015/042390
PCT Pub. Date: Mar. 26, 2015

(65) Prior Publication Data
US 2016/0228972 A1    Aug. 11, 2016

Related U.S. Application Data

(63) Continuation-in-part of application No. 14/031,420, filed on Sep. 19, 2013, now Pat. No. 9,642,236.

(60) Provisional application No. 61/991,114, filed on May 9, 2014.

(51) Int. Cl.
| | | |
|---|---|---|
| *B23K 10/00* | (2006.01) | |
| *B23K 9/32* | (2006.01) | |
| *F23D 14/52* | (2006.01) | |
| *H05H 1/34* | (2006.01) | |
| *F16L 37/252* | (2006.01) | |

(52) U.S. Cl.
CPC ............... *B23K 9/323* (2013.01); *B23K 9/32* (2013.01); *B23K 10/00* (2013.01); *F23D 14/52* (2013.01); *H05H 1/34* (2013.01); *F16L 37/252* (2013.01); *H05H 2001/3473* (2013.01)

(58) Field of Classification Search
CPC ........ B23K 9/323; B23K 90/32; B23K 10/00; F24D 14/52; H05H 1/34
USPC ......... 219/121.52, 121.51, 121.5, 75, 121.39
See application file for complete search history.

(56) References Cited

U.S. PATENT DOCUMENTS

| | | |
|---|---|---|
| 906,217 A | 12/1908 | Gaylord |
| 1,325,468 A | 12/1919 | Foster |
| 4,628,177 A | 12/1986 | Dempsey et al. |

(Continued)

FOREIGN PATENT DOCUMENTS

| | | |
|---|---|---|
| EP | 0757408 | 5/1997 |
| EP | 0 933 981 | 4/1999 |

(Continued)

*Primary Examiner* — Mark H Paschall
(74) *Attorney, Agent, or Firm* — Proskauer Rose LLP

(57) ABSTRACT

A connector component (102) is provided for assembly into a material processing torch head. The connector component (102) comprises a generally cylindrical body (104) that includes a proximal end (106) and a distal end (108) defining a longitudinal axis. At least two thread regions (112) are disposed at a radial location on a surface of the body near the proximal end. Each thread region includes at least one thread (114) disposed on the surface of the body. In addition, at least two non-thread regions (116) are oriented longitudinally at a radial location on the surface of the body (104).

48 Claims, 15 Drawing Sheets

(56) References Cited

U.S. PATENT DOCUMENTS

| | | |
|---|---|---|
| 4,695,702 A | 9/1987 | Gartland |
| 5,399,831 A | 3/1995 | McGee |
| 5,874,707 A | 2/1999 | Iida et al. |
| 6,169,264 B1 | 1/2001 | Marhic |
| 6,283,511 B1 | 9/2001 | Kamp |
| 6,713,711 B2 | 3/2004 | Conway et al. |
| 6,881,921 B2 | 4/2005 | Horner-Richardson et al. |
| 6,957,972 B2 | 10/2005 | Starke et al. |
| 6,987,237 B2 | 1/2006 | Walters |
| 6,987,238 B2 | 1/2006 | Horner-Richardson et al. |
| 7,429,714 B2 | 9/2008 | DePetrillo et al. |
| 2005/0218132 A1 | 10/2005 | Wells |
| 2008/0185842 A1 | 8/2008 | Blackman et al. |
| 2009/0123226 A1 | 5/2009 | Viegener |
| 2009/0170364 A1 | 7/2009 | Scholler et al. |
| 2011/0259855 A1 | 10/2011 | Yang |
| 2012/0272508 A1 | 11/2012 | Stauss |

FOREIGN PATENT DOCUMENTS

| | | |
|---|---|---|
| EP | 1988324 | 11/2008 |
| JP | 57-44467 | 3/1982 |
| JP | 2009-534803 A | 9/2009 |
| WO | 0128728 A2 | 4/2001 |
| WO | 03041459 | 5/2003 |
| WO | 2004043637 A2 | 5/2004 |
| WO | 2013028487 | 2/2013 |

THREAD CONNECTION FOR A TORCH SYSTEM

CROSS REFERENCE TO RELATED APPLICATIONS

This application is a continuation-in-part of U.S. Ser. No. 14/031,420, filed Sep. 19, 2013 and titled "Thread Connection for a Torch System" and U.S. Ser. No. 61/991,114, filed May 9, 2014 and titled "Cartridge Type Consumable Assembly for a Plasma Arc Cutting System," the contents of both of which are hereby incorporated herein by reference in their entirety.

FIELD OF THE INVENTION

The present invention relates generally to one or more connector components configured for connecting torch parts to a torch system.

BACKGROUND OF THE INVENTION

Material Processing heads, such as plasma torches, water jet cutting heads, and laser heads, are widely used in the heating, cutting, gouging and marking of materials. For example, a plasma arc torch generally includes electrical connections, passages for cooling, passages for arc control fluids (e.g., plasma gas), and consumables, such as an electrode and a nozzle having a central exit orifice mounted within a torch body. Optionally, a swirl ring is employed to control fluid flow patterns in the plasma chamber formed between the electrode and the nozzle. In some plasma arc torches, a retaining cap can be used to maintain the nozzle and/or swirl ring in the torch body.

One or more connector components can be used to attach the consumables to a torch system. Existing connector components with standard threading, however, can require as many as five complete rotations to engage or disengage a consumable. Changing consumable parts may be frequent, often occurring several times a day. Hence, existing connector components can slow down the consumable changing process, thereby reducing the time that can be spent on cutting and other useful torch operations.

SUMMARY OF THE INVENTION

Thus, systems and methods are needed to simplify the engagement and disengagement of a torch part in relation to a torch system, such as reducing the number and/or degree of rotation required to fully engage or disengage the torch parts. By allowing torch connections to be engaged or disengaged faster and easier, handling time of a torch can be reduced. Conversely, torch operation time can be increased.

In one aspect, a connector component is provided for assembly into a torch. The connector component comprises a body that includes a proximal end and a distal end disposed along a longitudinal axis. At least two thread regions are disposed radially about the longitudinal axis on a surface of the body near the proximal end. Each thread region includes at least two parallel threads disposed on the surface of the body. In addition, at least two smooth regions are each disposed radially about the longitudinal axis interspersed between a pair of thread regions on the surface of the body.

In some embodiments, the connector component comprises a male component configured to securely engage a female component. The male component can include a gap disposed at the distal end of the body. The gap is configured to prevent rotation of the male component in the female component unless the gap is aligned with a corresponding rim of the female component.

In some embodiments, the connector component comprises a female component configured to securely engage a male component. The female component can include a rim disposed on the distal end of the body. The rim is configured to prevent rotation of the male component in the female component unless the rim is aligned with a corresponding gap of the male component.

In some embodiments, the at least two thread regions are disposed radially about the body in a rotationally symmetrical arrangement. In some embodiments, the at least two smooth regions are disposed radially about the body in a rotationally symmetrical arrangement. In some embodiments, the at least two parallel threads are oriented substantially helical about the longitudinal axis. In some embodiments, the at least two parallel threads are oriented substantially orthogonal to the longitudinal axis. The at least two parallel threads can be evenly spaced relative to each other along the longitudinal axis.

In some embodiments, the connector component includes three thread regions.

In some embodiments, the threads of one thread region are discontinuous from the threads of an adjacent thread region. The location and orientation of the threads on one thread region can be substantially the same as those of another thread region.

In some embodiments, the connector component is configured to secure a corresponding component. At least one of the smooth regions of the connector component can be configured to align with at least one of the thread regions of the corresponding component to facilitate slidable displacement of one component into the other component. During engagement, one component can be rotatable in relation to the other component in a first direction by a number of degrees less than 360° to secure the other component. For example, the number of degrees can be less than or equal to about 60°, 90°, or 180°. The components can be disengaged when one component is rotated in relation to the other component in a second direction opposite from the first direction by about the same number of degrees.

In some embodiments, the connector component is coupled to a consumable of the plasma arc torch for attaching the consumable to another element of the plasma arc torch. The consumable can comprise one of an electrode, nozzle, retaining cap, shield or torch.

In another aspect, a consumable connector component is provided for attaching a consumable to a corresponding component of a torch. The consumable connector component comprises a cylindrical body that includes a proximal end and a distal end disposed along a longitudinal axis. Multiple longitudinally-oriented smooth regions are disposed radially about a surface of the body about the proximal end. In addition, multiple longitudinally-oriented segments are disposed radially about the body interspersed between the smooth regions. Each segment includes a plurality of threads disposed in parallel to one another along the surface of the body such that the threads of one segment are discontinuous from the threads of an adjacent segment.

In some embodiments, the location and orientation of the threads on one segment are substantially the same as those of a different segment.

In some embodiments, the discontinuous threads prevent a segment of the consumable connector component from engaging more than one segment of the corresponding component during rotation.

In another aspect, a method is provided for engaging a first component and a second component for a torch. The first and second components each has i) a plurality of thread regions each having a plurality of threads and ii) a plurality of slotted regions characterized by the absence of threads. The method includes aligning radially at least one thread region of the first component with at least one slotted region of the second component, sliding the first component into the second component longitudinally in the radially aligned position, and rotating the first component in one direction relative to the second component to engage at least one thread of the thread region of the first component with at least one thread of the thread region of the second component to secure the first and second components relative to one another.

In some embodiments, the method further comprises preventing the first component from rotating with respect to the second component during the sliding, engaging a gap of the first component with a rim of the second component, and rotating the first component relative to the second component in one direction after the engaging.

In some embodiments, rotating the first component relative to the second component comprises rotating the first component by a number of degrees less than 360°. The number of degrees can be a number that is less than or equal to about 60°, 90° or 180°.

In some embodiments, the method further comprises rotating the first component relative to the second component in an opposite direction by about the same number of degrees to disengage the two components. During disengagement, the first component can be prevented from rotating further in the opposite direction when an edge of a thread region of the first component encounters an edge of a thread region of the second component in the rotational path (i.e., when misalignment of the threads occurs).

In some embodiments, at least one of the first component or the second component is coupled to a consumable of the plasma arc torch.

In some embodiments, the method further comprises aligning radially the plurality of thread regions of the first component with the plurality of slotted region of the second component.

In some embodiments, the method further comprises aligning radially the plurality of slotted regions of the first component with the plurality of thread regions of the second component.

In yet another aspect, a connector component is configured for assembly into a material processing head. The connector component includes a generally cylindrical body including a proximal end and a distal end defining a longitudinal axis, at least two thread regions disposed at a radial location on a surface of the body near the proximal end, and at least two non-threaded regions oriented longitudinally at a radial location on the surface of the body. Each thread region includes at least one thread disposed on the surface of the body. Each non-threaded region disposed between a pair of the thread regions.

In some embodiments, the proximal end extends to about half of the longitudinal length of the connector component.

In some embodiments, at least one of the thread regions extends radially at least 50 degrees about the surface of the body. The thread regions can be disposed radially about the body in a rotationally symmetrical arrangement. In some embodiments, the connector component includes three thread regions. Each thread of a thread region can have a helix angle of about 3 degrees. In some embodiments, the at least one thread of one thread region is discontinuous from the at least one thread of an opposing thread region. The at least one thread of each thread region can extend substantially orthogonal to the longitudinal axis.

In some embodiments, the connector component is coupled to a consumable. The consumable can comprise one of an electrode, a cartridge, or a retaining cap.

In some embodiments, the connector component comprises a male component configured to securely engage a female component. The connector component can further comprise an axial stop disposed radially about the surface of the body between the distal end and the thread regions, the axial stop configured to contact the female component. For example, the male component can be aligned to the female component via the axial stop prior to rotational engagement of the threads. In some embodiments, the connector component is configured to secure a corresponding component. At least one of the non-threaded regions of the connector component can be configured to align with at least one of the thread regions of the corresponding component to facilitate slidable displacement of one component into the other component. To engage the components, one component can be rotatable in relation to the other component in a first direction by a number of degrees less than 360 degrees to secure the other component. To disengage the components, one component can be rotated in relation to the other component in a second direction opposite from the first direction by about the same number of degrees.

In yet another aspect, a consumable connector component is provided for attaching a consumable to a corresponding component of a material processing head. The consumable connector component comprises a cylindrical body including a proximal end and a distal end disposed along a longitudinal axis, a plurality of longitudinally-oriented smooth regions disposed radially about a surface of the body near the proximal end; and a plurality of longitudinally-oriented segments disposed radially about the body interspersed between the smooth regions. Each segment includes at least one thread disposed along the surface of the body such that the at least one thread of one segment is discontinuous from the at least one thread of an opposing segment.

In some embodiments, the proximal end extends to about half of the longitudinal length of the connector component.

In some embodiments, at least one of the segments extends radially at least 50 degrees about the surface of the body. The segments can be disposed radially about the body in a rotationally symmetrical arrangement. In some embodiments, the connector component includes three segments. Each thread of a segment can have a helix angle of about 3 degrees. In some embodiments, the at least one thread of each segment can extend radially about the body.

In some embodiments, the consumable connector component is coupled to a consumable. The consumable can comprise one of an electrode, a cartridge, or a retaining cap.

In some embodiments, the consumable connector component comprises a male component configured to securely engage a female consumable component. The connector component can further comprise an axial stop disposed radially about the surface of the body between the distal end and the segments, the axial stop configured to contact the female consumable component. For example, the male consumable component can be aligned to the female consumable component via the axial stop prior to rotational engagement of the threads. In some embodiments, the consumable connector component is configured to secure a corresponding component. At least one of the smooth regions of the consumable connector component can be configured to align with at least one of the segments of the corresponding component to facilitate slidable displacement of one component into the other component. To engage the components, one component can be rotatable in relation to the other component in a first direction by a number of degrees less than 360 degrees to secure the other component. To disengage the components, one component can be rotated in relation to the other component in a second direction opposite from the first direction by about the same number of degrees.

In yet another aspect, a method is provided for engaging a first component and a second component for a material processing head. The first and second components each has i) at least one thread region having at least one thread and ii) at least one slotted region characterized by the absence of threads. The method includes aligning radially the at least one thread region of the first component with the at least one slotted region of the second component, sliding the first component relative to the second component longitudinally in the radially aligned position, and rotating the first component in one direction relative to the second component to engage the at least one thread of the thread region of the first component with the at least one thread of the thread region of the second component to secure the first and second components relative to one another.

The method can further include aligning radially the at least one slotted region of the first component with the at least one thread region of the second component prior to sliding the first component into the second component. In some embodiments, sliding the first component into the second component comprises axially abutting the first component and the second component.

The method can further include preventing the first component from rotating with respect to the second component during the sliding, engaging a gap of the first component with a rim of the second component, and rotating the first component relative to the second component in one direction after the engaging. In some embodiments, rotating the first component relative to the second component comprises rotating the first component by a number of degrees less than 360°. The number of degrees can be one of less than or equal to about 60°, 90° or 180°. In some embodiments, the method further includes rotating the first component relative to the second component in an opposite direction by about the same number of degrees to disengage the two components. During disengagement, the first component can be prevented from rotating further in the opposite direction when an edge of a thread region of the first component encounters an opposing face of a thread region of the second component in the rotational path.

In some embodiments, at least one of the first component or the second component is coupled to a consumable of the plasma arc torch.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
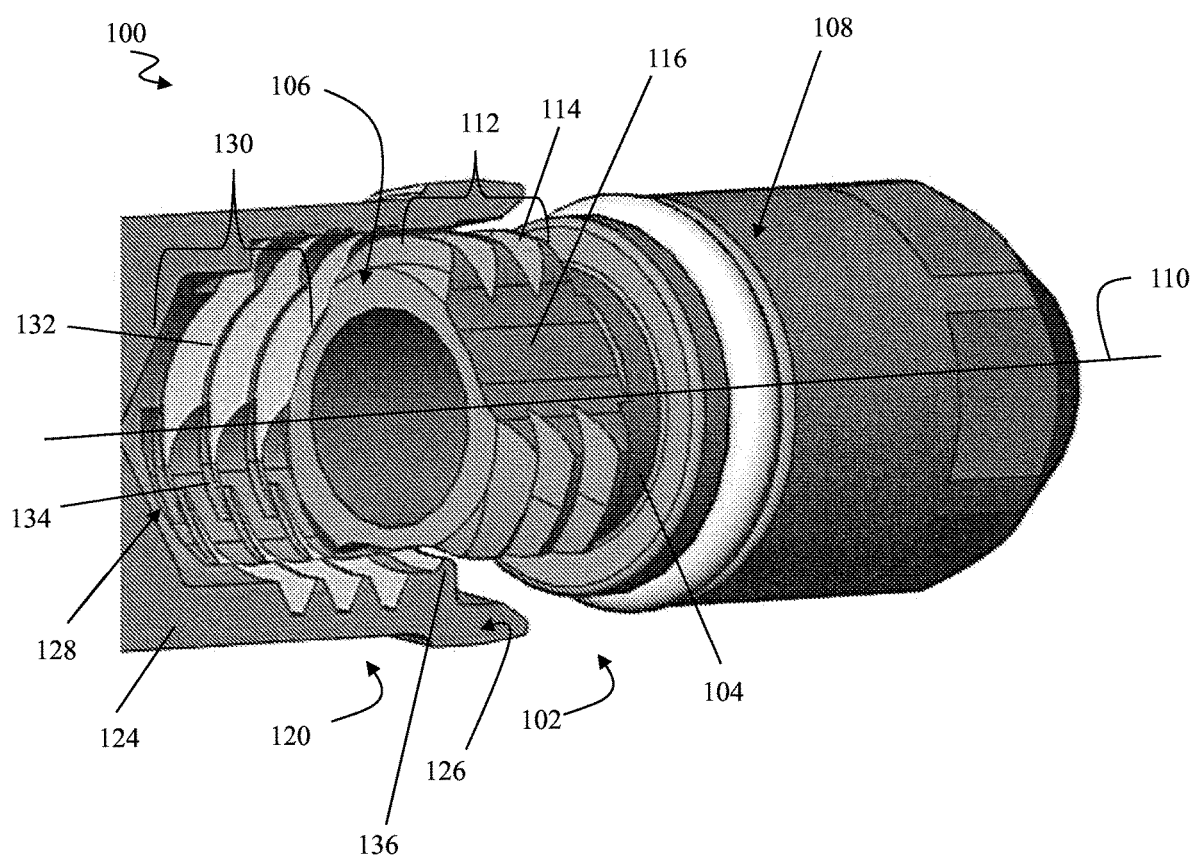
FIG. 1 illustrates an exemplary connector assembly, according to some embodiments of the present invention.

Technologies of the present invention allow torch consumables to be installed and removed faster and easier than standard threaded connections, such as with fewer rotations and/or reduced number of rotational degrees. Technologies of the present invention are applicable to connection of various components in a material processing head, such as a plasma arc torch, laser head, or waterjet cutting head. FIG. 1 illustrates an exemplary connector assembly, according to some embodiments of the present invention. The connector assembly 100 includes a male connector component 102 and a female connector component 120, both of which are configured for assembly into a torch (not shown). In some embodiments, each of the connector components 102, 120 is coupled to a consumable for attachment to one another. Exemplary consumables to which a connector component can be coupled include an electrode, nozzle, retaining cap, shield or torch body. As an example, the female connector component 120 can be integrally constructed on a torch body while the male connector component 102 can be integrally constructed on a nozzle or an electrode for secure engagement with the torch body.

As shown in FIG. 1, the male connector component 102 includes a body 104 having a proximal end 106 and a distal end 108 disposed along a longitudinal axis 110. The proximal end 106 of the male connector component 102 can be characterized as the end that encounters the female connector component 120 first as the male connector component 102 advances into female connector component 120 for engagement. At least two thread regions 112 are disposed radially about the longitudinal axis 110 on an outer surface of the body 104 near the proximal end 106. Each thread region 112 includes at least two parallel threads 114 disposed on the outer surface of the body 104. In some embodiments, the threads 114 are evenly spaced relative to each other and substantially orthogonal to the longitudinal axis 110. In some embodiments, the threads 114 are substantially evenly spaced relative to each other and oriented substantially helically about the longitudinal axis 110. In addition, the male connector component 102 includes at least two smooth regions 116 characterized by the absence of threads or other non-regular features. Each smooth region 116 is disposed radially about the longitudinal axis 110 between a pair of thread regions 112 on the outer surface of the body 104.

Similarly, the female connector component 120 includes a body 124 having a proximal end 126 and a distal end 128 disposed along the longitudinal axis 110. The proximal end 126 of the female connector component 120 is characterized as the end that encounters the male connector component 102 first as the female connector component 120 advances towards the male connector component 102 during engagement. At least two thread regions 130 are disposed radially about the longitudinal axis 110 on an inner surface of the body 124 near the proximal end 126. Each thread region 130 can include at least two parallel threads 132 disposed on the inner surface of the body 124. In some embodiments, these threads 132 are evenly spaced relatively to each other and substantially orthogonal to the longitudinal axis 110. In some embodiments, the threads 132 are substantially evenly spaced relative to each other and oriented substantially helically about the longitudinal axis 110. In addition, the female connector component 120 includes at least two smooth regions 134 characterized by the absence of threads or other non-regular features. Each smooth region 134 is disposed radially about the longitudinal axis 110 between a pair of thread regions 130 on the surface of the body 124. In general, the female connector component 120 includes complementary features in comparison to the male connector component 102 to facilitate the secure engagement of the two components.

In some embodiments, each smooth region 116 of the male connector component 102 is appropriately dimensioned such that it functions as a slot for aligning with and receiving a thread region 130 of the female connector component 120. The radial extent of the smooth region 116 can be substantially the same as the radial extent of the thread region 130. Conversely, each smooth region 134 of the female connector component 120 is appropriately dimensioned such that it functions as a slot for aligning with and receiving a thread region 112 of the male connector component 102. The radial extent of the smooth region 134 can be substantially the same as the radial extent of the thread region 112. The smooth regions 116 of the male connector component 102 and the smooth regions 134 of the female connector component 120 can guide the slidable displacement of one component in relation to the other component in the longitudinal direction 110, both during engagement and disengagement.

Figure 2A:
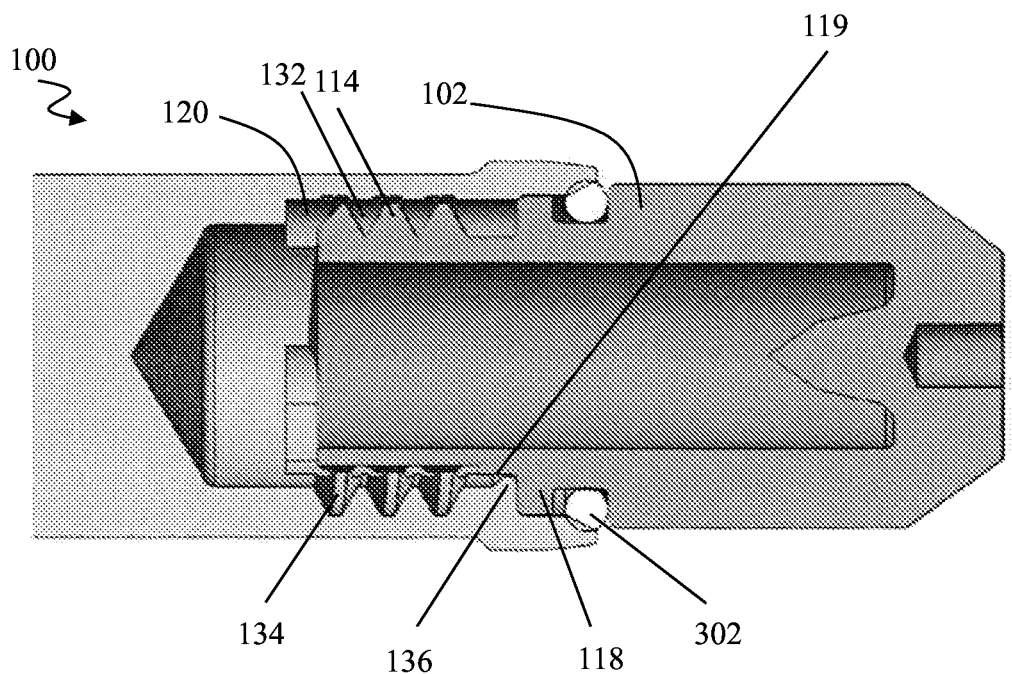
FIGS. 2A and B illustrate various views of the connector assembly of FIG. 1 in the inserted position, according to some embodiments of the present invention.
Figure 2B:
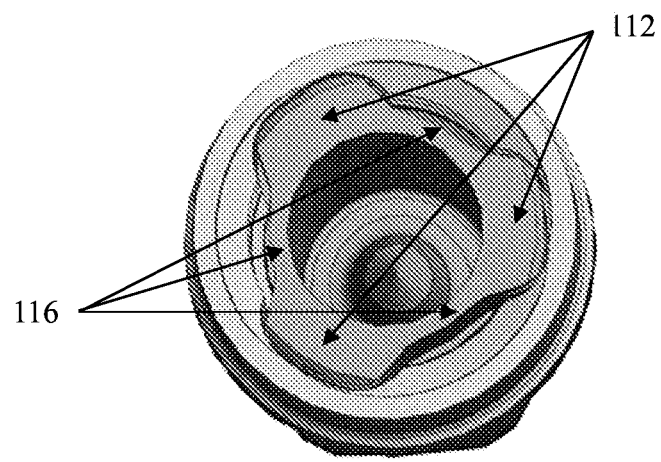

In some embodiments, rotational engagement between the male connector components 102 and the female connector component 120 is only allowed after the male connector component 102 slides to a stopping position within the female connector component 120 in the longitudinal direction 110. This position is hereinafter referred to as the "inserted position," which is prior to the occurrence of rotation. FIGS. 2A and B illustrate various views of the connector assembly of FIG. 1 in the inserted position, according to some embodiments of the present invention. As shown in FIG. 2A, the male component 102 includes a flange 118 disposed at the distal end 108 of the body 104, and the female component 120 includes a stopping rim 136 disposed at the distal end 128 of the body 124. The flange 118 and the stopping rim 136 are configured to interact with each other to prevent further advancement of the male connector component 102 beyond the stopping rim 136 of the female connector component 120 in the longitudinal direction 110. In addition, no rotation of the male connector component 102 within the female connector component 120 can occur during the advancement due to misalignment of the threads 114, 132 on the two components. Rotation is only permitted after the male connector component 102 is fully inserted in the female connector component 120 and the stopping rim 136 of the female connector component 120 locks into position with a rim gap 119 of the male connector component 102, at which point threads 114 on the male connector component 102 are properly positioned relative to the threads 132 on the female connector component 120 to permit threading. In the inserted position, as shown in FIG. 2B, each thread region 112 of the male connector component 102 faces a smooth region (not shown) of the female connector component 120 and each smooth region 116 of the male connector component 102 faces a thread region (not shown) of the female connector component 120.

Figure 3A:
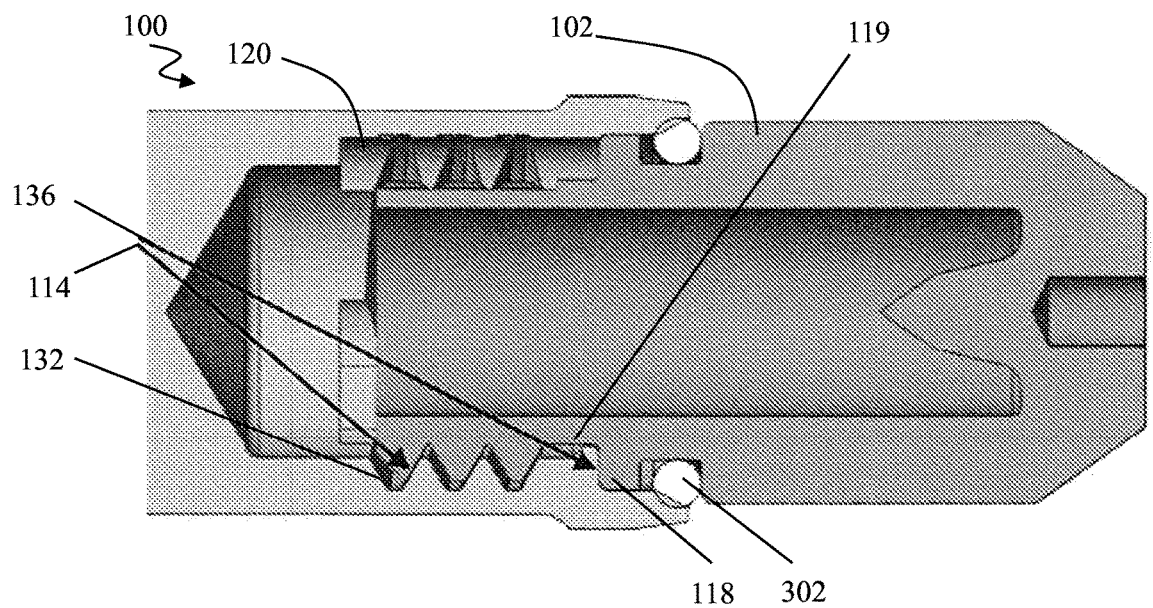
FIGS. 3A and B illustrate various views of the connector assembly of FIG. 1 in the locked position, according to some embodiments of the present invention.
Figure 3B:
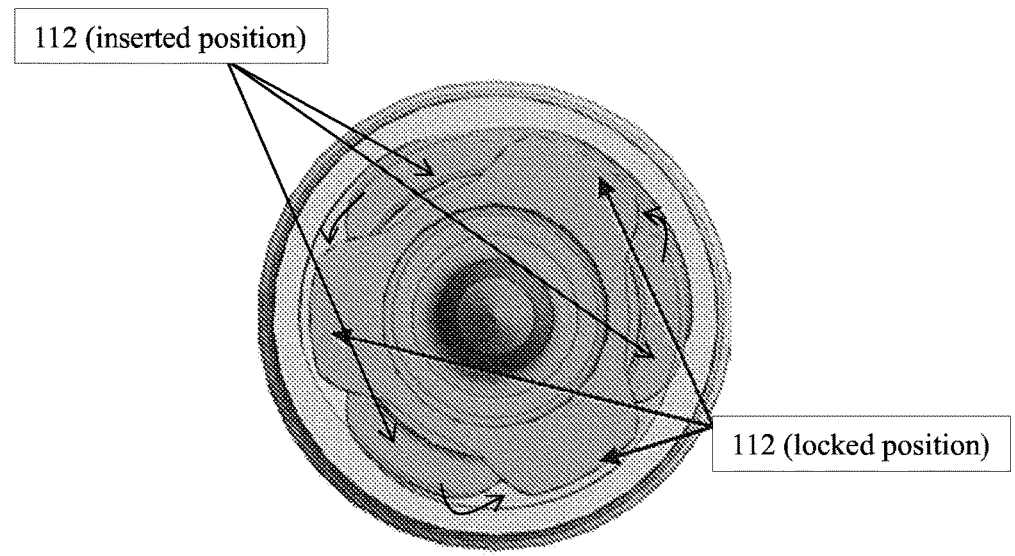

Once the inserted position is reached, one connector component is rotatable in relation to the other connector component in a direction (i.e., clock-wise or counter-clockwise) by a number of degrees less than 360° before the components are securely fastened to each other. This position is hereinafter referred to as the "locked position." In contrast, traditional threaded designs require rotation of at least 360° before being able to securely engage two components. FIGS. 3A and B illustrate various views of the connector assembly of FIG. 1 in the locked position, according to some embodiments of the present invention. To secure the components, the male connector component 102 can be rotated within the female connector component 120 such that the threads 114 of at least one thread region 112 of the male connector component 102 lock into position with the threads 132 of an adjacent thread region 130 of the female connector component 120 in the rotational path, as shown in FIG. 3A. The interlocking between the threads facilitates engagement and prevents further rotation. Thus, during engagement, threads in one, or more, or all of the thread regions of the components can be engaged simultaneously with one rotation of less than 360°. FIG. 3B illustrates that, to reach the locked position, the male connector component 102 is rotated in a counter-clock wise direction by less than or equal to 60 degrees from the inserted position. In other embodiments, engagement between the two components can be achieved by rotation in a clockwise direction. In the locked position, each thread region 112 of the male connector component 102 faces a thread region (not shown) of the female connector component 120 and each smooth region (not shown) of the male connector component 102 faces a smooth region (not shown) of the female connector component 120.

To disengage the two components (i.e., moving from the locked position to the inserted position), an operator can rotate one component in relation to the other component in a direction opposite from the direction of engagement by about the same number of degrees. Thus, during disengagement, threads in one, or more, or all thread regions of the connector components can be disengaged simultaneously with one rotation of less than 360°. When the inserted position is reached upon disengagement, each thread region 112 of the male connector component 102 again faces a smooth region 134 of the female connector component 120 and vise versa. The inserted position facilitates the slideably displacement of the male connector component 102 out of the female connector component 120.

In some embodiments, each thread 132 on the female connector component 120 is wider longitudinally than a standard thread so as to allow the corresponding thread 114 on the male connector component 102 to engage over a wider axial range. In some embodiments, each female thread 132 is a 16-pitch thread, which translates to an axial shift along the longitudinal direction 110 of about 0.010 inch when rotated about 60° between the inserted position and the locked position. In some embodiments, the wider width of the female threads 132 is adapted to prevent accidental engagement with the male threads 114 when in the inserted position (i.e., prior to rotation to the locked position). Otherwise, the male threads 114 can extend beyond the entrance of the groove of the adjacent female threads 132 even in the inserted position, thus unintentionally locking the components to each other. In alternative embodiments, however, threads of the two components can be engaged before reaching the locked position.

In some embodiments, the threads of one thread region are discontinuous from the threads of an adjacent thread region for each of the connector components 102, 120. That is, for each connector component, the pitch of each thread does not create a continuous path from one thread region to the next. This is to prevent the threads of one thread region of one component from accidentally engaging the threads of an adjacent thread region of the other component in the rotational path during disengagement. Specifically, during disengagement, when male threads 114 of a thread region 112 is rotated back to the inserted position, the male threads 114 are prevented from further engagement with the female threads 132 of an adjacent thread region 130 in the rotational path because the male threads 114 cannot align with the adjacent female thread 132.

In general, the degree of rotation required for maximum engagement of the female connector component 120 and the male connector component 102 is dependent the number of thread regions and smooth regions disposed on a body of each component. For example, if each component has one smooth region and one thread region, the degree of rotation is 180°. If each component has two smooth regions and two thread regions, the degree of rotation is 90°. If each component has three smooth regions and three thread regions, the degree of rotation is about 60°. FIGS. 1-3 show that the male connector component 102 includes three thread regions 112 interspersed among three smooth regions 116, such that each thread region 112 is between a pair of smooth regions 116. In a complementary fashion, the female connector component 120 includes three thread regions 130 interspersed among three smooth regions 134, such that each thread region 130 is between a pair of smooth regions 134. To minimize the degree of rotation required to join the female and male connector component, an even higher number of smooth regions and/or thread regions per connector component is possible. In addition to the number of thread and/or smooth regions, the amount of rotation is also dependent on the tolerances and locations of the threads.

One possible limitation associated with applying a small number of degrees of rotation (e.g., about 60°) for engagement is that it may be difficult to use the threading motion to convert rotational force into axial force so to overcome resistance (e.g., O-ring friction) generated from insertion over a relatively long longitudinal distance. The severity of the resistance depends on a number of factors, including the type of resistance, the size of the parts and the thread pitch. In some embodiments, a tapered O-ring seal 302 is used to reduce the length of resistance and allow the components to be easily inserted to the required depth.

Figure 4A:
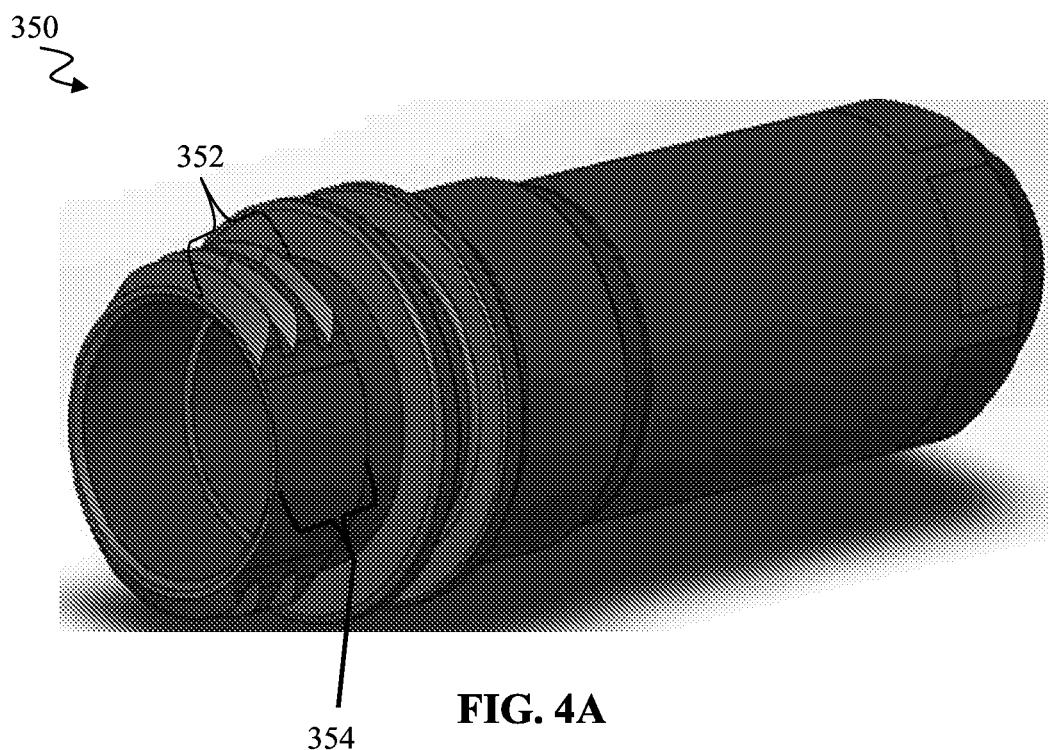
FIGS. 4A and B illustrate another exemplary set of female and male connector components, according to some embodiments of the present invention.
Figure 4B:
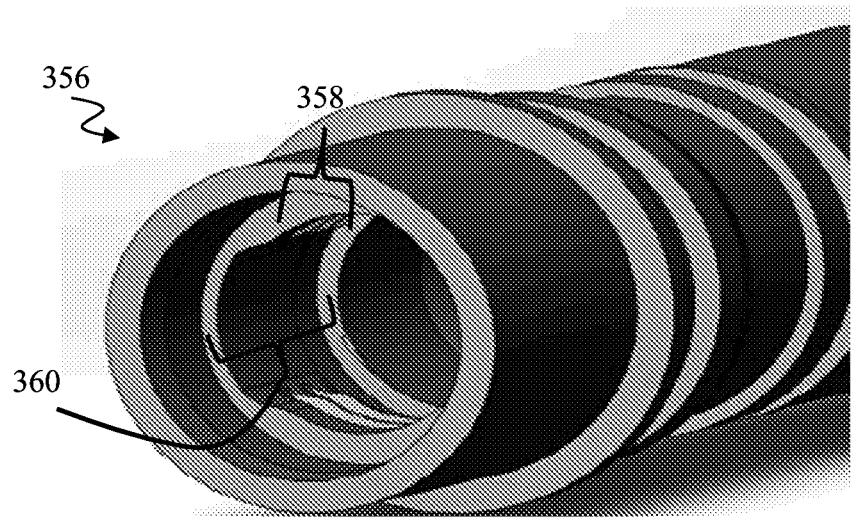

FIGS. 4A and B illustrate another exemplary set of female and male connector components, respectively, according to some embodiments of the present invention. As shown, the male connector component 350 of FIG. 4A includes two thread regions 352 and two smooth regions 354 on an exterior surface of the component. Similarly, the female connector component 356 of FIG. 4B include two thread regions 358 and two smooth regions 360 on an interior surface of the component. The male and female connector components 350, 356 function similarly to the corresponding components of the connector assembly 100 described above with reference to FIGS. 1-3, except a rotation of less than or equal to about 90° can be applied to achieve engagement and disengagement between the connector components, 350, 356. This is due to the presence of two thread regions/smooth regions on each connector component in comparison to three thread regions/smooth regions associated with the connector assembly 100.

The connector assembly of FIG. 1 or 4 can be constructed by modifying a standard thread profile or using a custom profile. To customize the design of each connector component, one or more identical thread regions can be fabricated on a smooth component body in various rotational positions, such as in three different rotational positions if three thread regions per component is desired. In some embodiments, during the machining process of each component, the threads in each thread region is properly spaced from the stop structure (i.e., a stop rim 136 for the female connector component 120 or a flange 118 for the male connector component 102 of connector assembly 100) to ensure interchangeability over the life of the components.

In some embodiments, to ensure interchangeability of the components and rotational symmetry during the engagement/disengagement process, the thread regions of each connector component are configured to be rotationally symmetrical about the body of the connector component. Similarly, the smooth regions are also radially disposed about the body in a rotationally symmetrical manner. In addition, the location and orientation of the threads on one thread region of a component can be substantially the same as those of another thread region of the same component or that of a mating component. This means that the threads are fabricated in identical sections as oppose to continuous threads. In some embodiments, thread milling is used to produce the thread sections on both the female connector component 120 and the male connector component 102. The radially-symmetrical geometry of the connector components suggest that the male connector component 102 can be inserted into the female connector component 120 for engagement in multiple rotational positions, depending on the number of thread regions/smooth regions present.

Figure 5:
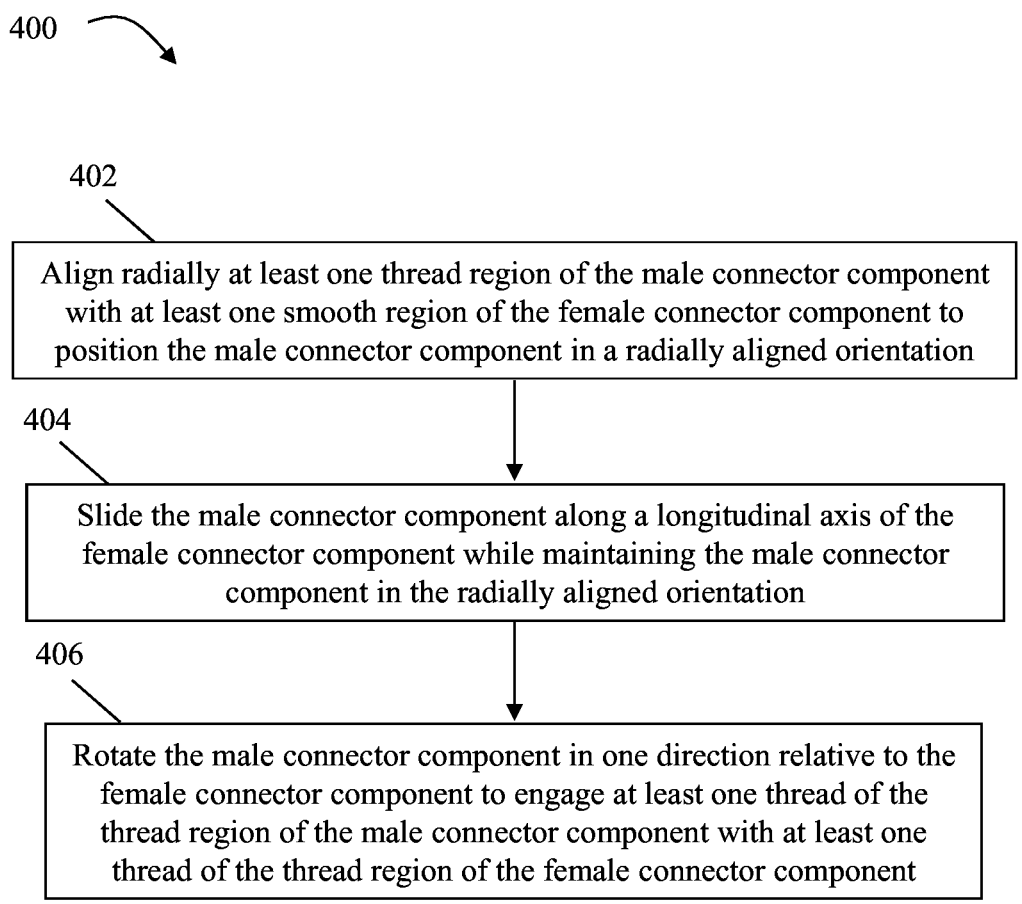
FIG. 5 illustrates a method for securing a male connector component to a female connector component, according to some embodiments of the present invention.

FIG. 5 illustrates a method 400 for securing a male connector component to a female connector component, such as the male connector component 102 to the female connector component 120 of FIG. 1, according to some embodiments of the present invention. At step 402, each of the thread regions 112 of the male connector component 102 is radially aligned with a smooth region 134 of the female connector component 120. Conversely, each of the smooth regions 116 of the male connector component 102 can be radially aligned with a thread region 130 of the female connector component 120. In some embodiments, the thread regions of both the female connector component 120 and the male connector component 102 are about identical. That is, the location and orientation of the threads on one thread region are substantially the same as those of a different thread region associated with the same or different components. In addition, the thread regions and smooth regions can be rotationally symmetrical about each of the components. In view of such geometry, the radial alignment between the components at step 402 can be achieved in several rotational positions, relatively independent of the angle of insertion of the male connector component 102 into the female connector component 120.

At step 404, the male connector component 102 is inserted along the longitudinal direction 110 into the female connector component 120 while being maintained in the radially aligned orientation. The insertion can be accomplished without any rotation. In some embodiments, the sliding stops when the flange 118 of the male connector component 102 encounters the stop rim 136 of the female connector component 120 (i.e., the inserted position). In some embodiments, the two components are prevented from rotating relative to each other until the inserted position is reached and the stopping rim 136 locks into position with the rim gap 119, at which point the threads of the two components are aligned to permit rotation.

At the inserted position of step 406, the male connector component 102 is rotated in one direction relative to the female connector component 120 to lock the threads 114 of at least one thread region 112 of the male connector component 102 with the threads 132 of an adjacent thread region 130 of the female connector component 120 in the rotational path, thereby securing the components to one another. The amount of rotation required to achieve maximum engagement at the locked position can be less than 360°, such as less than or equal to about 60°, 90° or 180°.

To disengage the components, the male connector component 102 can be rotated relative to the female connector component 120 in an opposite direction by about the same number of degrees as the rotation used during the engagement process. While disengaging, the male connector component 102 is prevented from rotating further in the opposite direction in the female connector component 120 when an edge of a thread region 112 of the male component 102 encounters an edge of a thread region 130 of the female component 120 in the rotational path.

Even though the method of FIG. 5 is described with the male connector component 102 being rotatable relative to the female connector component 120 during both the engagement and disengagement processes, the female connector component 120 can also be rotated with respect to the male connector component 102 to achieve the same effects.

Figure 6:
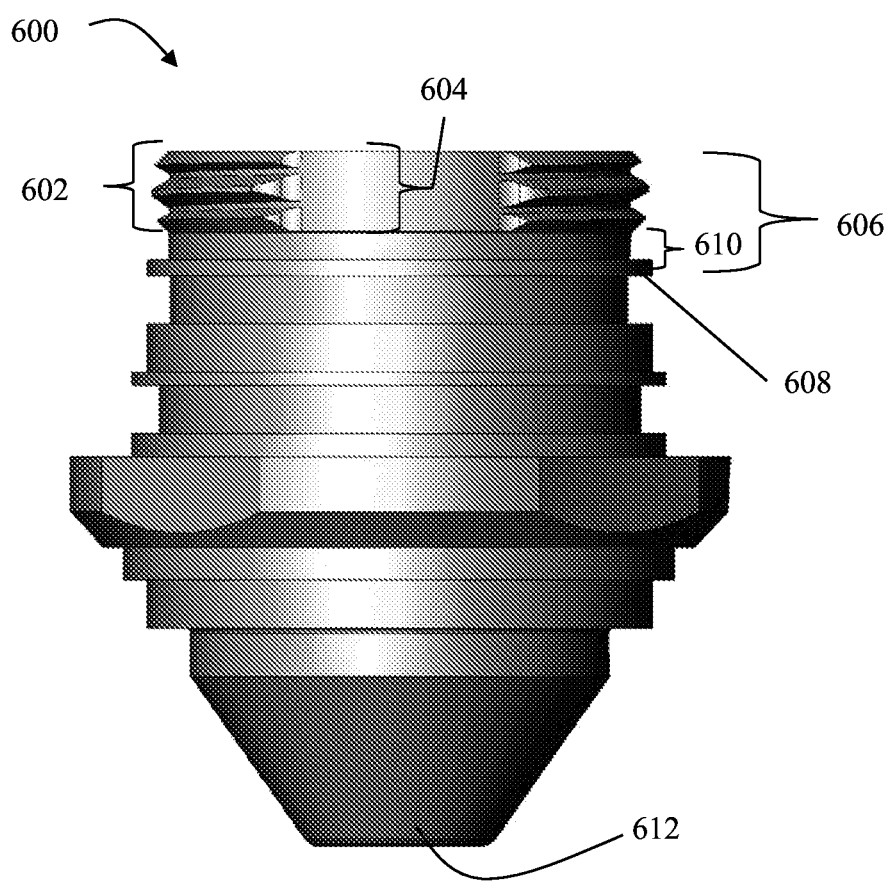
FIG. 6 illustrates an exemplary connector component associated with a nozzle, according to some embodiments of the present invention.

FIG. 6 illustrates an exemplary nozzle having a connector component disposed thereon, according to some embodiments of the present invention. As shown, the nozzle 600 includes a male connector component 606 disposed at the distal end of the nozzle 600 away from the nozzle tip 612. The male connector component 606 is configured to engage with a female connector component (not shown). The male connector component 606 can be integrally constructed from the body of the nozzle 600 or comprise a separate structure coupled to the nozzle 600. The male connector component 606 has two thread regions 602 and two smooth regions 604. The male connector component 606 also includes a flange 608 for interacting with a stopping rim (not shown) of a female connector component to prevent the male connector component 606 from further advancing inside of the female connector component when in the inserted position. The male connector component 606 additionally includes a rim gap 610 for interlocking with a stopping rim of the female connector component to permit rotation of the male connector component 606 inside of the female connector component when the inserted position is reached. Rotation from the inserted position to the locked position is also facilitated by the alignment of the thread regions 602 of the male connector component 606 with corresponding adjacent thread regions (not shown) of the female connector component in the rotational path.

Figure 7:
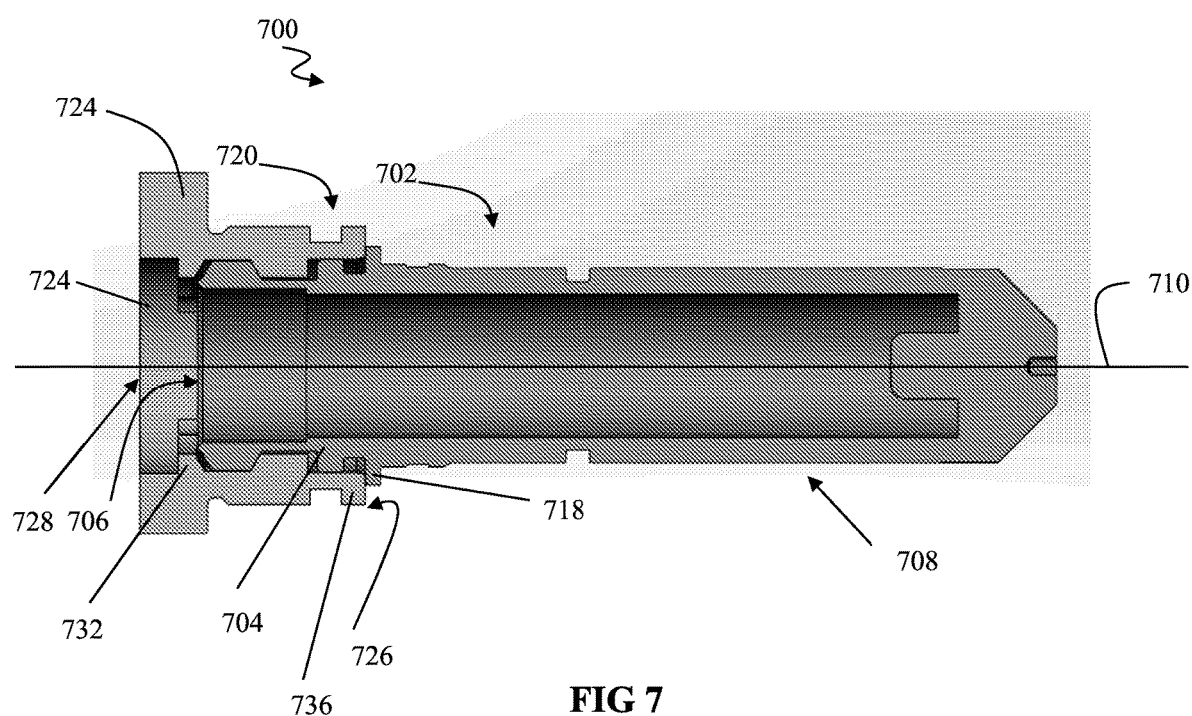
FIG. 7 illustrates another exemplary connector assembly including a male connector component and a female connector component, according to some embodiments of the present invention.

FIG. 7 illustrates another exemplary connector assembly including a male connector component and a female connector component, according to some embodiments of the present invention. The connector assembly 700 includes a male connector component 702 and a female connector component 720, both of which are configured for assembly into a material processing head (not shown), such as a plasma arc torch, water jet cutting head, or laser cutting head. In some embodiments, each of the connector components 702, 720 is coupled to (or a part of) a consumable for attachment to one another. Exemplary consumables to which a connector component can be associated with include electrode, nozzle, retaining cap, shield or torch body.

Figure 8A:
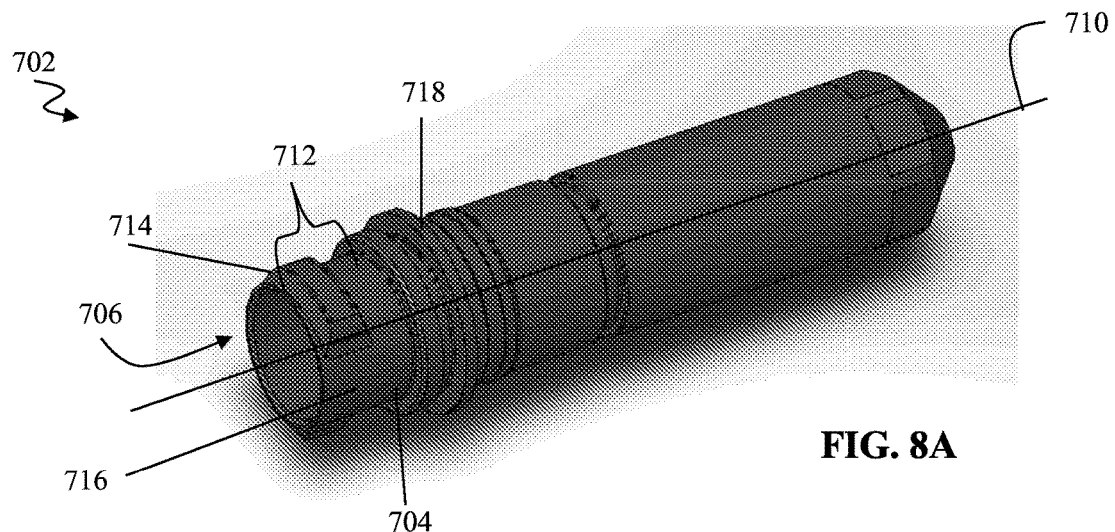
FIGS. 8A-C illustrate various views of the male connector component of FIG. 7.
Figure 8B:
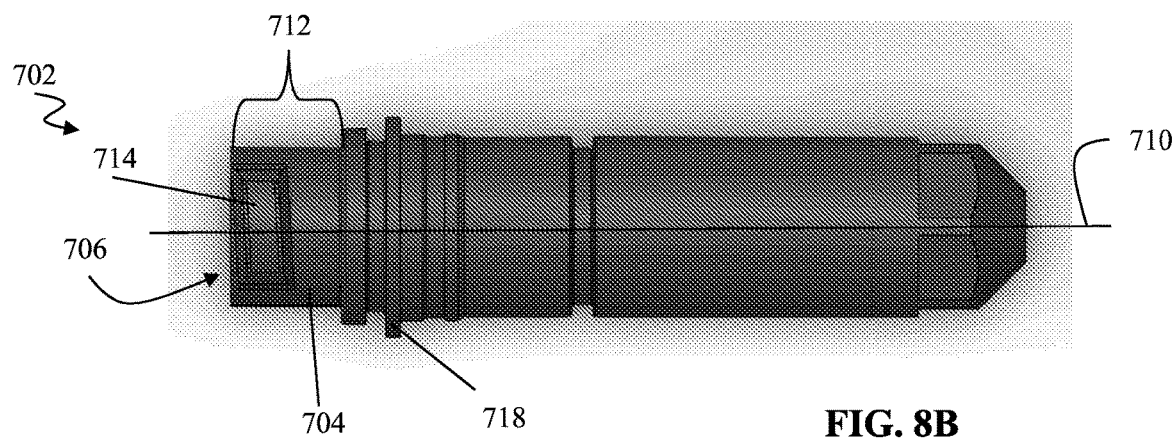
Figure 8C:
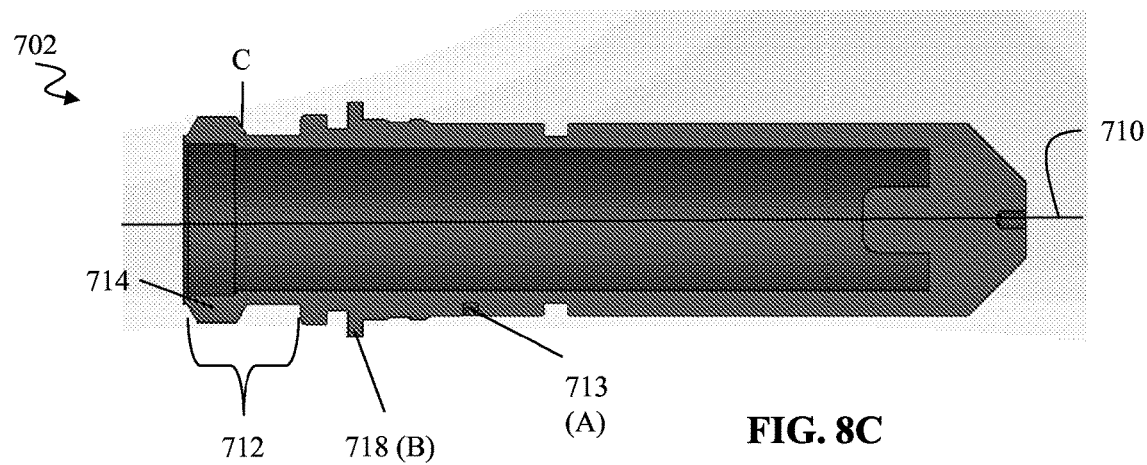

The male connector component 702 includes a body 704 that has a proximal end 706 and a distal end 708 disposed along a longitudinal axis 710. The proximal end 706 of the male connector component 702 can be characterized as the end that encounters the female connector component 720 first when the male connector component 702 advances into female connector component 720 for engagement. The proximal end 706 can extend up to about half of the longitudinal length of the male connector component 702. FIGS. 8A-C illustrate various views of the male connector component 702 of FIG. 7. As shown, at least one thread region 712 is disposed radially about a portion of the longitudinal axis 710 on an external surface of the body 704 near the proximal end 706. Each thread region 712 includes at least one thread 714 disposed on the external surface of the body 704. In some embodiments, the thread 714 is oriented substantially orthogonal to the longitudinal axis 710. In some embodiments, the thread 714 is oriented substantially helically about the longitudinal axis 710. For example, the thread 714 can have a helix angle of about 3 degrees. In some embodiments, the thread 714 extends at least 50 degrees radially about the external surface of the body 704. In addition, the male connector component 702 includes at least one smooth region 716 (i.e., non-threaded region) characterized by the absence of threads or other non-regular features. Each smooth region 716 is disposed radially about the longitudinal axis 710 adjacent to at least one thread region 712 on the external surface of the body 704. Even though FIGS. 8A-C show that the male connector component 702 has two thread regions 712 and two smooth regions 716 interposed between the pair of thread regions 712, in other embodiments, a male connector component 702 can have more or fewer smooth regions 716 and thread regions 712 (e.g., only one thread region 712 adjacent to one smooth region 716).

Figure 9A:
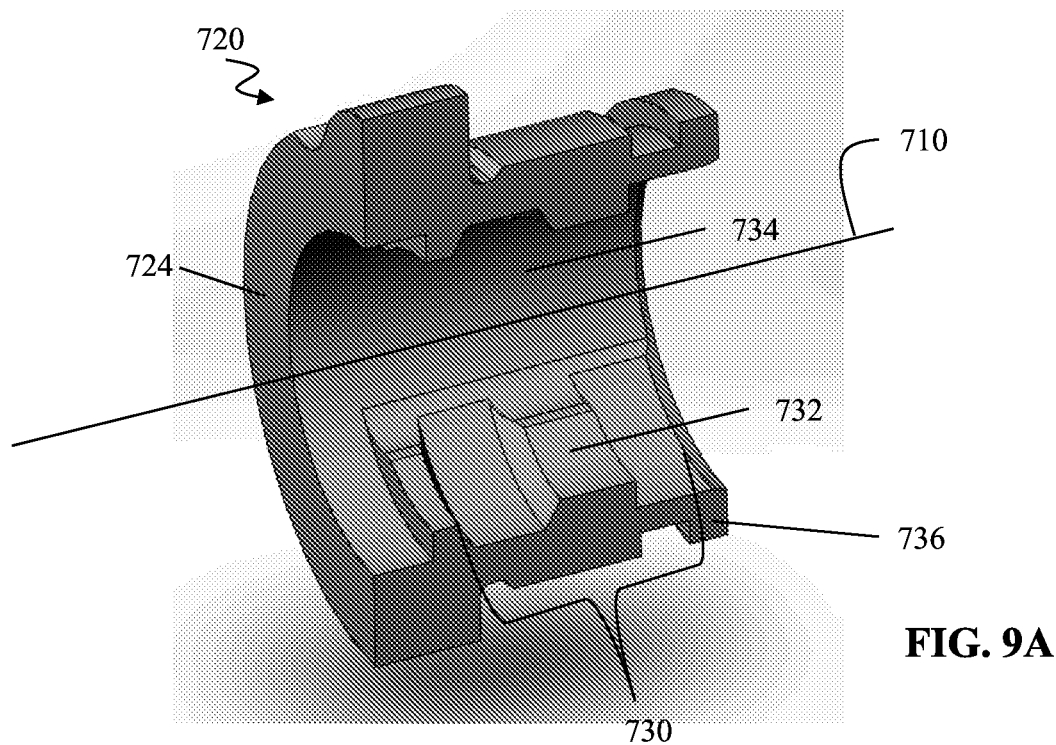
FIGS. 9A and B illustrate various views of the female connector component of FIG. 7.
Figure 9B:
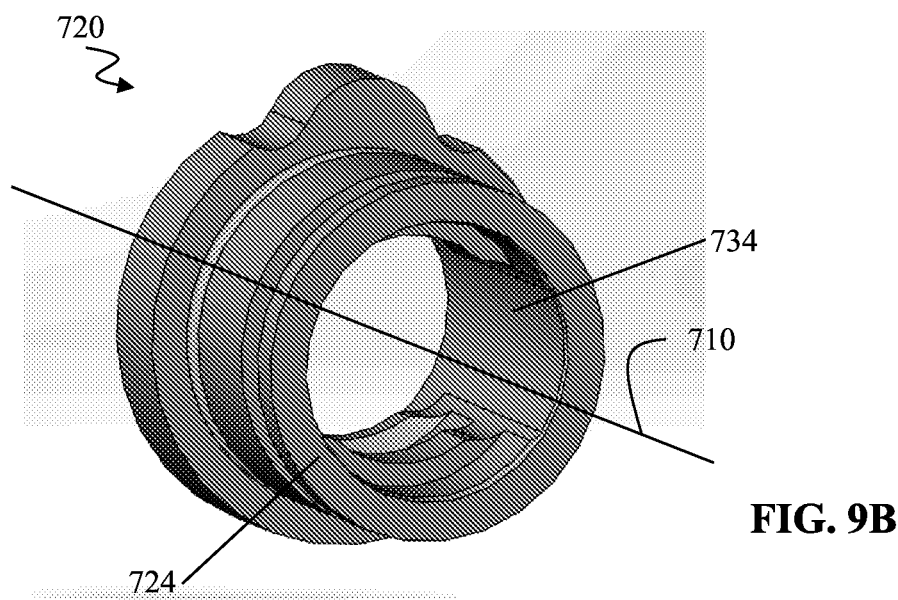

Referring to FIG. 7, similar to the male connector component 702, the female connector component 720 includes a body 724 having a proximal end 726 and a distal end 728 disposed along the longitudinal axis 710. The proximal end 726 of the female connector component 720 is characterized as the end that encounters the male connector component 702 first when the female connector component 720 advances towards the male connector component 702 during engagement. In some embodiments, the proximal end 726 extends up to about half of the longitudinal length of the female connector component 720. In some embodiments, the proximal end 726 extends up to about 90% of the longitudinal length of the female connector component 720. FIGS. 9A and B illustrate various views of the female connector component 720 of FIG. 7. At least one thread region 730 is disposed radially about the longitudinal axis 710 on an internal surface of the body 724 near the proximal end 726. Each thread region 730 can include at least one thread 732 disposed on the internal surface of the body 724. In some embodiments, the thread 732 is oriented substantially orthogonal to the longitudinal axis 710. In some embodiments, the thread 732 is oriented substantially helically about the longitudinal axis 710. For example, the thread 732 can have a helix angle of about 3 degrees. In some embodiments, the thread 732 extends at least 50 degrees radially about the internal surface of the body 724. In addition, the female connector component 720 includes at least one smooth region 734 (i.e., non-threaded region) characterized by the absence of threads or other non-regular features. Each smooth region 734 is disposed radially about the longitudinal axis 710 adjacent to at least one thread region 730 on the internal surface of the body 724. Even though FIGS. 9A and B show that the female connector component 720 has two thread regions 730 and two smooth regions 734 interposed between the pair of thread regions 730, in other embodiments, a female connector component 720 can have more or fewer smooth regions 734 and thread regions 730 (e.g., only one thread region 730 adjacent to one smooth region 734). In general, the female connector component 720 includes complementary features in comparison to the male connector component 702 to facilitate the secure engagement of the two components.

Each smooth region 716 of the male connector component 702 can be appropriately dimensioned such that it functions as a slot for aligning with and receiving a thread region 730 of the female connector component 720. Conversely, each smooth region 734 of the female connector component 720 is appropriately dimensioned such that it functions as a slot for aligning with and receiving a thread region 712 of the male connector component 702. For each connector component, the thread regions and the smooth regions can be disposed radially about the respective connector component body in a rotationally symmetrical arrangement. In some embodiments, the radial extent of a smooth region 716 of the male connector component 702 is substantially the same as the radial extent of a thread region 730 of the female connector component 720. Similarly, the radial extent of a smooth region 734 of the female connector component 720 is substantially the same as the radial extent of a thread region 712 of the male connector component 702. In general, the smooth region(s) 716 of the male connector component 102 and the smooth region(s) 134 of the female connector component 120 can guide the slidable displacement of one component in relation to the other component in the longitudinal direction 710, both during engagement and disengagement.

Similar to the connector assembly described above with reference to FIGS. 1-3B, the male connector component 702 can include an axial stop 718 disposed radially about the external surface of the connector body 704 between the distal end 708 and the thread region(s) 712. The axial stop 718 is configured to contact a portion of the female connector component 720 during engagement of the two components. For example, the axial stop 718 can help align the female connector component 720 with the male connector component 702 prior to rotational engagement of the respective threads. FIG. 7 shows that the axial stop 718 of the male connector component 702 comprises a flange. The female component 720 includes a stopping rim 736 configured to interact with the flange 718 to prevent further axial advancement of the male connector component 702 within the female connector component 720 in the longitudinal direction 710 after a stopping position, hereinafter referred to as the "inserted position," is reached. In addition, no rotation of the male connector component 702 within the female connector component 720 can occur during the axial advancement prior to reaching the inserted position due to misalignment of the threads 714, 732 on the two components. Instead, during the axial advancement of the male connector component 702 into the female connector component 720 along the longitudinal direction 710, at least one of the smooth regions 716 of the male connector component 702 is configured to align with at least one of the thread regions 730 of the female connector component 720 and vice versa to facilitate slidable axial displacement of one component into the other component. Rotation is only permitted after the male connector component 702 is inserted in the female connector component 720 in the inserted position, where the stopping rim 736 of the female connector component 720 encounters the flange 718, at which point thread(s) 714 on the male connector component 702 are properly positioned relative to the thread(s) 732 on the female connector component 720 to permit rotational engagement (e.g., threading).

Similar to the connector assembly of FIGS. 1-3B, for the connector assembly of FIG. 7, once the inserted position is reached, one connector component is rotatable in relation to the other connector component in a direction (i.e., clockwise or counter-clockwise) by a number of degrees less than 360° before the components are securely fastened to each other, hereinafter referred to as the "locked position." To reach the locked position, as the male connector component 102 is rotated within the female connector component 720, the thread(s) 714 of a thread region 712 of the male connector component 702 can lock into position with the corresponding thread(s) 732 of an adjacent thread region 730 of the female connector component 720 in the rotational path. The interlocking between the threads facilitates engagement and prevents further rotation. In some embodiments, the rotational movement between the connector components to reach the locked position during engagement does not involve any further axial advancement in the longitudinal direction 710. In some embodiments, the rotational movement between the connector components to reach the locked position during engagement is also accompanied by some axial advancement of the male connector component 702 in the female connector component 720 in the longitudinal direction 710. In the locked position, each thread region 712 of the male connector component 702 faces a thread region 732 of the female connector component 720 and each smooth region 716 of the male connector component 702 faces a smooth region 734 of the female connector component 720.

Similarly, to disengage the two components (i.e., moving from the locked position to the inserted position), an operator can rotate one component in relation to the other component in a direction opposite to the direction of engagement by about the same number of degrees. In some embodiments, the rotational movement between the connector components during disengagement does not involve any axial movement in the longitudinal direction 710. In some embodiments, the rotational movement between the connector components during disengagement is accompanied by some axial withdrawal of the male connector component 702 from the female connector component 720 in the longitudinal direction 710. When the inserted position is reached upon disengagement, each thread region 712 of the male connector component 702 again faces a smooth region 734 of the female connector component 720 and vice versa. The inserted position facilitates the slideable displacement of the male connector component 702 out of the female connector component 720 along the longitudinal direction 710. No rotation is permitted when the male connector component 702 slides out of the female connector component 720.

In some embodiments, as shown in FIG. 8C, the male connector component 702 includes a clocking feature 713, such as a recess, disposed in the body 704. The clocking feature 713 provides a reference point for determining where to position the thread 714 along the longitudinal direction 710 during the manufacturing of the component 702. For example, a desired longitudinal distance between the clocking feature 713 (point A) and the pitch diameter (point C) of the thread 714 along the longitudinal direction 710 is used to precisely locate the thread 714 in relation to the clocking feature 713 when manufacturing the connector component. As another example, the longitudinal distance between the axial stop 718 (point B) and the thread 714 at the pitch diameter (point C) can be precisely controlled at the location of the clocking feature 713 (point A). The pitch diameter is the diameter of a cylindrical surface of a thread at which male and female threads engage to achieve the locked position. Hence, the clocking feature 713 allows one to control where the thread 714 starts and where it locks with the corresponding female thread. A similar locating feature (not shown) can be situated in the female connector component 720.

Figure 16A:
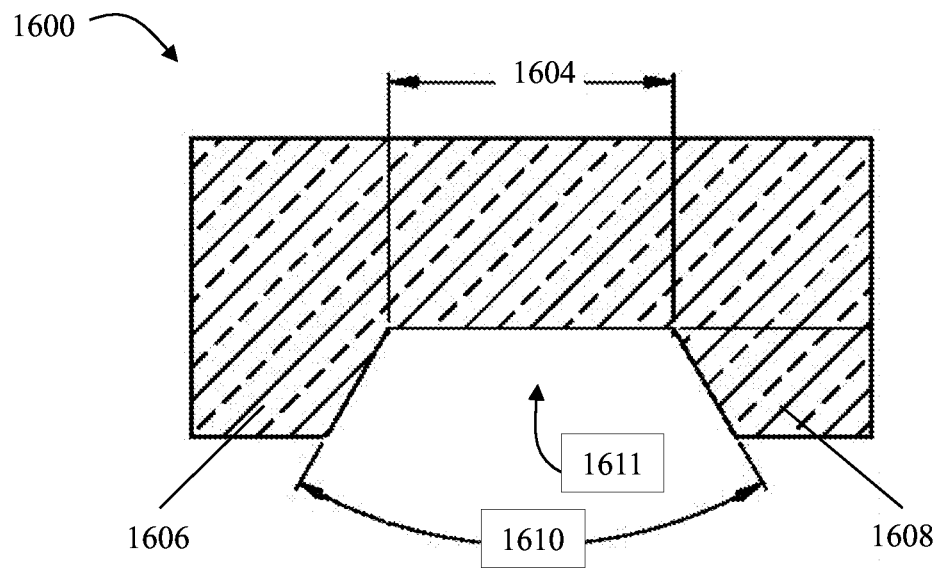
FIGS. 16A and B illustrate the thread profiles of an exemplary set of complimentary connector components.
Figure 16B:
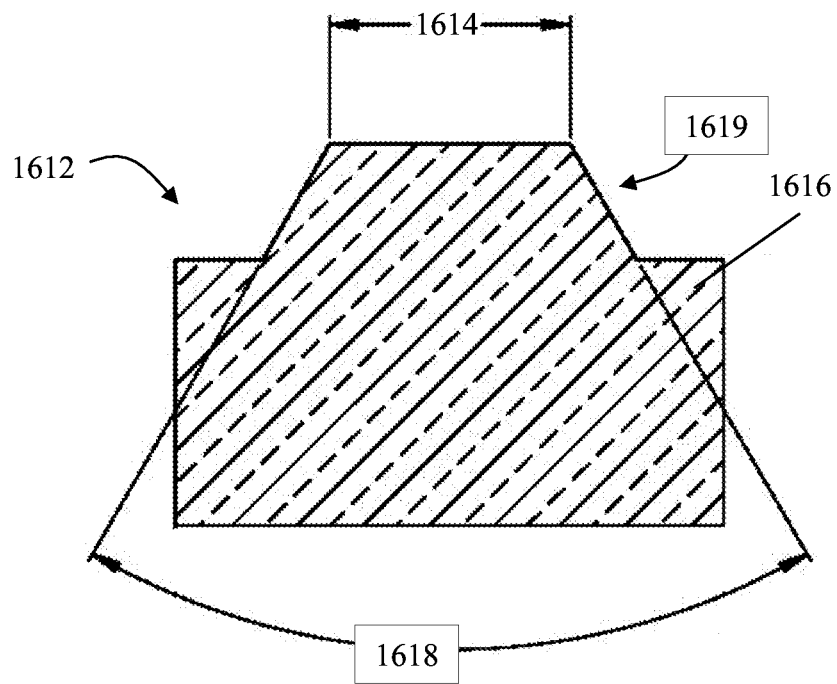

In some embodiments, for each thread of a male connector component 702 and/or a female connector component 720, the circumferential ends of the thread have a rounded contour at its tip (rather than a linear or angular contour). This arcuate shape can reduce burring and assist with thread engagement. In some embodiments, each thread of the male and female connector components is relatively thick, thus less likely to cross thread or otherwise engage in the reverse rotational direction during disengagement, where the thick width of the male and female threads are adapted to block one another and prevent binding. FIGS. 16A and B illustrate the thread profiles of an exemplary set of complementary connector components along a longitudinal (i.e., axial) direction. The connector component 1600 of FIG. 16A can be a male connector component, in which case the connector component 1612 of FIG. 16B is a female connector component. Conversely, the connector component 1600 of FIG. 16A can be a female connector component, in which case the connector component 1612 of FIG. 16B is a male connector component. For the connector component 1600 of FIG. 16A, the axial distance 1604 between the bases of two adjacent threads 1606, 1608 in a thread region can be about 0.095 inches. The angle 1610 between the adjacent tips of the two threads 1606, 1608 can be about 60 degrees. For the connector component 1612 of FIG. 16B, the axial length 1614 of the tip portion 1619 of a thread 1616 can be about 0.08 in. The angle 1618 between the circumferential ends of the thread 1616 can be about 60 degrees. A recess region 1611 between the two adjacent threads 1606, 1608 of the connector component 1600 can be configured to receive the tip portion 1619 of the thread 1616 of the connector component 1612 when the two components are engaged.

In some embodiments, the thread(s) of one thread region is discontinuous from the thread(s) of an adjacent/opposing thread region for each of the connector components 702, 720. That is, for each connector component, the pitch of each thread does not create a continuous helical path from one thread region to the next. In addition, for a connector component, a thread of one thread region is physically and orientationally separate from another thread of an adjacent/opposing thread region. This is to prevent the thread of one thread region of one component from accidentally engaging the thread of an adjacent/opposing thread region of the other component in the rotational path during disengagement. Specifically, during disengagement, when a male thread 714 of a thread region 712 is rotated back to the inserted position, the male thread 714 is prevented from further engagement with the female thread 732 of an adjacent/opposing thread region 730 in the rotational path because the male thread 714 cannot align with that female thread 732.

In general, the degree of rotation required for maximum engagement and/or disengagement of the female connector component 720 and the male connector component 702 is dependent on the number of thread regions and smooth regions disposed on the body of each component. For example, if there is one thread region and one smooth region on each of the male and female connector components, the threads of these components can be engaged and/or disengaged with one rotation of about 180° or less, such as 90°. If there are two thread regions on each of the male and female connector components, the threads of these components can be engaged and/or disengaged with one rotation of about 90°. FIGS. 7-9B show that the male connector component 702 and the female connector component 720 each includes two thread regions interspersed among two smooth regions, such that each thread region is between a pair of smooth regions. In other embodiments, the male connector component 702 and the female connector component 720 each includes only one thread region adjacent to only one smooth region. In addition, each thread region of the male connector component 702 and the female connector component 720 can include one or more threads.

Figure 10A:
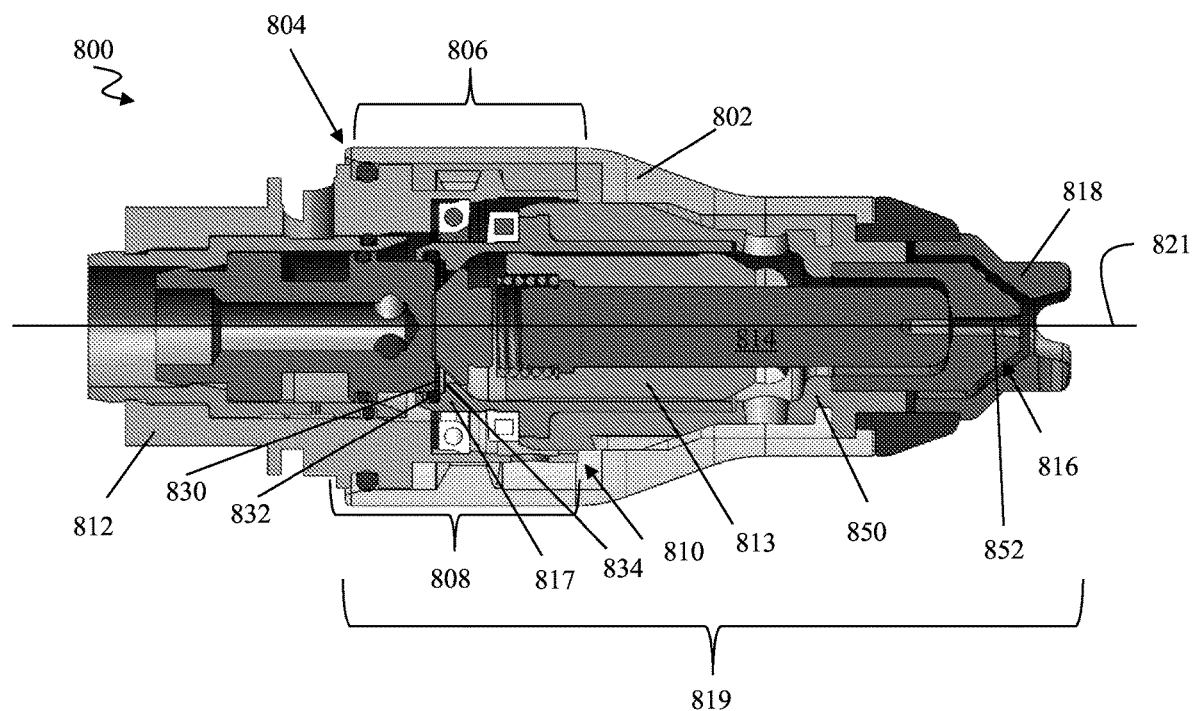
FIGS. 10A and B illustrate another exemplary connector assembly associated with a plasma arc torch, according to some embodiments of the present invention.
Figure 10B:
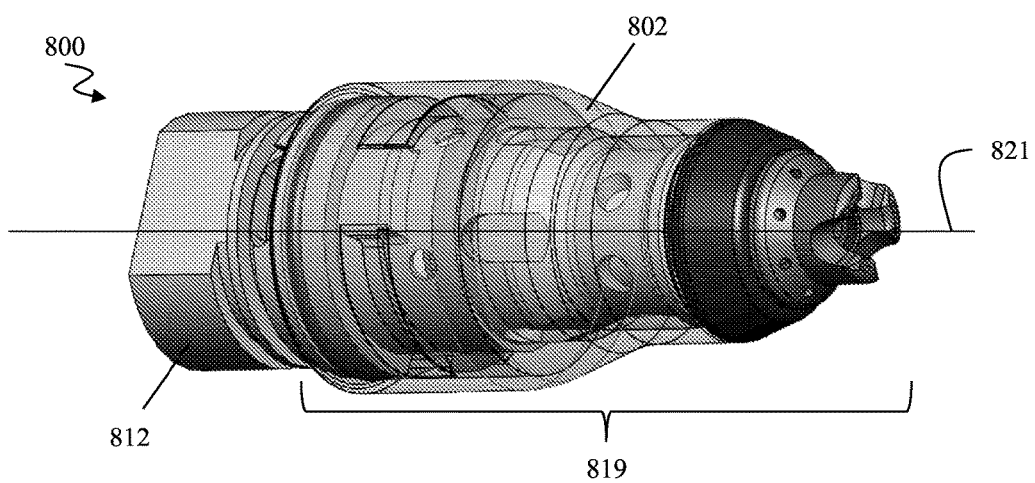

FIGS. 10A and B illustrate another exemplary connector assembly associated with a plasma arc torch 800, according to some embodiments of the present invention. As shown, a torch body 812 includes a male connector component 808 that is disposed at the proximal end 810 of the torch body 812. The male connector component 808 is configured to engage a female connector component 806 disposed at the proximal end 804 of a retaining cap 802 of the plasma arc torch 800. In some embodiments, the retaining cap 802 is an integral part of a consumable cartridge 819 that also includes at least one of an electrode 814, nozzle 816 (including a nozzle body 850, nozzle orifice 852 and nozzle shield (not shown)), electrode cylinder 817, electrode sleeve 813, shield 818, a set of insulator components, and/or other consumables of the plasma arc torch 800. In other embodiments, the retaining cap 802 is a stand-alone torch component.

Figures 11A, 11B:
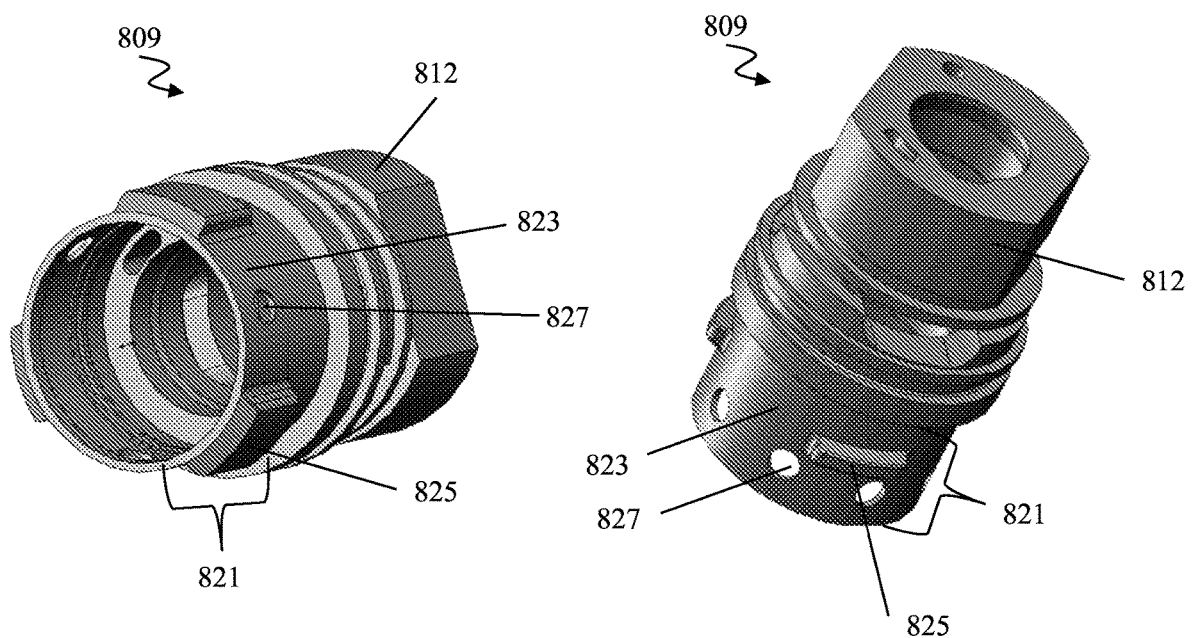
FIGS. 11A and B illustrate various views of another exemplary male connector component of the connector assembly of FIGS. 10A and B, where the male connector component is attached to a torch body.

FIGS. 11A and B illustrate various views of another male connector component design 809 compatible with the connector assembly of FIGS. 10A and B, where the male connector component 809 is configured to couple to the torch body 812. The male connector component 809 can be integrally formed from the torch body 812 or comprise a separate structure attached to the torch body 812. As shown, the male connector component 809 has three thread regions 821 substantially evenly interspersed among three smooth regions 823 around the circumference of the proximal end 810 of the torch body 812. Each thread region 821 includes at least one thread 825 extending radially around the proximal end 810. The pitch of the thread 825 can be between 3.5 and 5.5 turns/inch (each turn being 360 degrees). In general, the pitch of the thread 825 can be adjusted so that the amount of required axial movement along the longitudinal direction 821 can be realized within the desired amount of rotation. The thread 825 of the male connector component 809 can be relatively thick to prevent over binding or cross threading. The three thread regions 821 provide three different start positions for attaching the male connector component 809 of the torch body 812 to the corresponding female connector component 806 of the retaining cap 802. The uniform placement of the thread regions 821 allows them to evenly assume the load placed by the female connector component 806 after engagement. In some embodiments, there are fewer or more than three thread regions 821 disposed on the male connector component 809. In some embodiments, there is more than one thread 825 in each thread region 802. In some embodiments, holes 827 of different sizes and/or shapes are dispersed radially around the smooth regions 823 and the thread regions 821 to allow varied gas flows through the male connector component 809, such as gas flows of different volumes, different distribution patterns, etc. In some embodiments, the male connector component 808 of FIGS. 10A and B can be substantially similar to the male connector component 809 of FIGS. 11A and B.

Figure 12A:
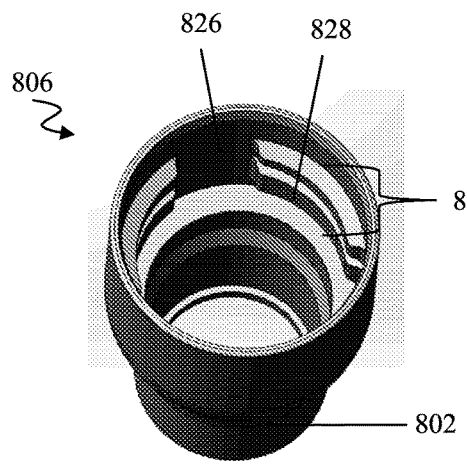
FIGS. 12A and B illustrate various views of an exemplary female connector component of the connector assembly of FIGS. 10A and B, where the female connector component is coupled to a retaining cap.
Figure 12B:
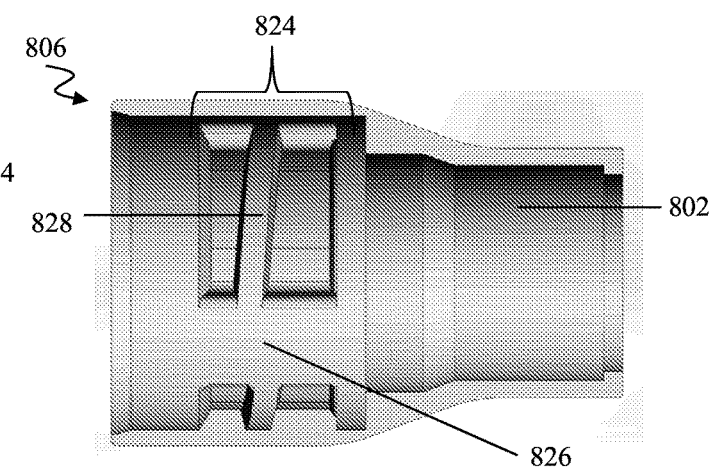

FIGS. 12A and B illustrate various views of an exemplary female connector component 806 of the connector assembly of FIGS. 10A and B, where the female connector component 806 is coupled to the retaining cap 802. The female connector component 806 can be integrally constructed from the retaining cap 802 or comprise a separate structure coupled to the retaining cap 802. In a complementary fashion in comparison to the male connector component 808, the female connector component 806 has three thread regions 824 interspersed among three smooth regions 826 around the circumference of the proximal end 804 of the retaining cap 802. Each thread region 824 includes at least one female thread 828 extending radially around the proximal end 804. The female thread 828 can have a similar pitch size as the male thread 822. In some embodiments, there are fewer or more than three thread regions 824 disposed on the female connector component 806. In some embodiments, there is more than one female thread 828 in each thread region 824.

Figure 13:
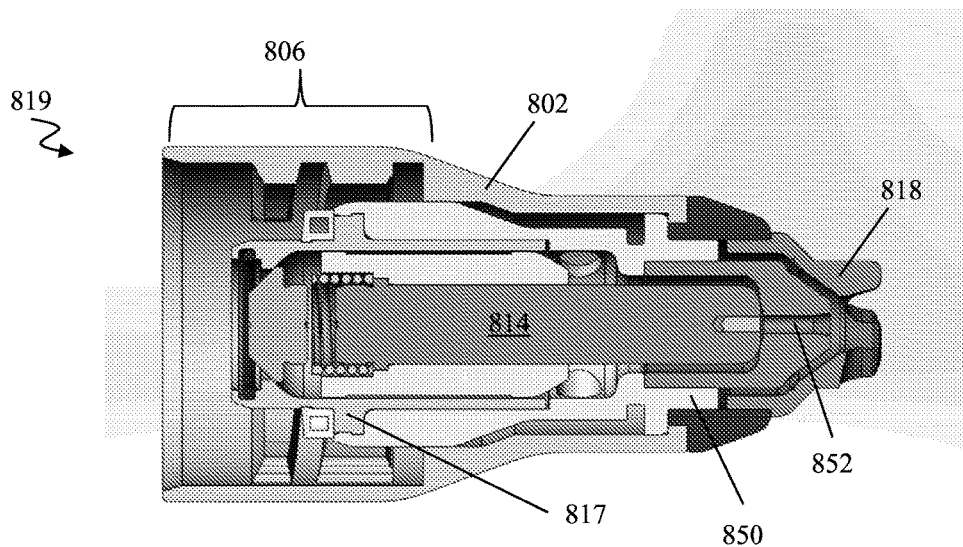
FIG. 13 illustrates an exemplary female connector component of the connector assembly of FIGS. 10A and B, where the female connector component is coupled to a consumable cartridge.

FIG. 13 illustrates an exemplary female connector component 806 of the connector assembly of FIGS. 10A and B, where the female connector component 806 is coupled to the consumable cartridge 819 via the retaining cap 802 of the cartridge 819. Because the cartridge 819 includes a suite of two or more consumable components chosen from a group including the retaining cap 802, electrode 814, nozzle 816 (including a nozzle body 850, nozzle orifice 852 and nozzle shield (not shown)), electrode cylinder 817, electrode sleeve 813, shield 818, a set of insulator components, and other consumable components, the cartridge 819 provides ease of use and shortens the time for assembling the plasma arc torch 800 in comparison to installing each consumable component individually. In addition, the use of the cartridge 819 in the torch 800 improves component alignment and cut consistency.

With reference to FIGS. 10A and B, to engage the male connector component 808 to the female connector component 806, the male connector component 808 is first inserted along a longitudinal direction 821 into the female connector component 806 while being maintained in a radially aligned orientation (i.e., the thread regions 820 of the male connector component 808 are aligned with the smooth regions 826 of the female connector component 806 and vice versa). The advancement of the male connector component 808 within the female connector component 806 in the radially aligned position can continue until an internal shoulder 830 of the torch body 812 comes into contact with at least one internal o-ring 832 of the electrode cylinder 817 or the nozzle body 850, where the o-ring 832 is situated proximal to a contact surface 834 of the electrode cylinder 817 or the nozzle body 850. During engagement, when the shoulder 830 of the torch body 812 touches the o-ring 832, a contact position is reached and the o-ring 832 begins to seal the shoulder 830 to the contact surface 834.

In some embodiments, when the contact position is reached, there is a gap of about 0.036 inches between the shoulder 830 and the contact surface 834 due the presence of the o-ring 832 between the two surfaces. In addition, no rotation of the male connector component 808 within the female connector component 806 can occur during the axial advancement prior to reaching the contact position due to misalignment of the threads on the two components. Rotation is only permitted after the contact position is reached (i.e., when the shoulder 832 of the torch body 812 encounters the o-ring 832), at which point the thread 822 on the male connector component 808 is properly positioned relative to the thread 828 on the female connector component 806 to permit rotational engagement. The amount of rotation is dependent on the pitch of the threads on the male and female connector components and the axial distance needed to securely engage the components.

Figure 14A:
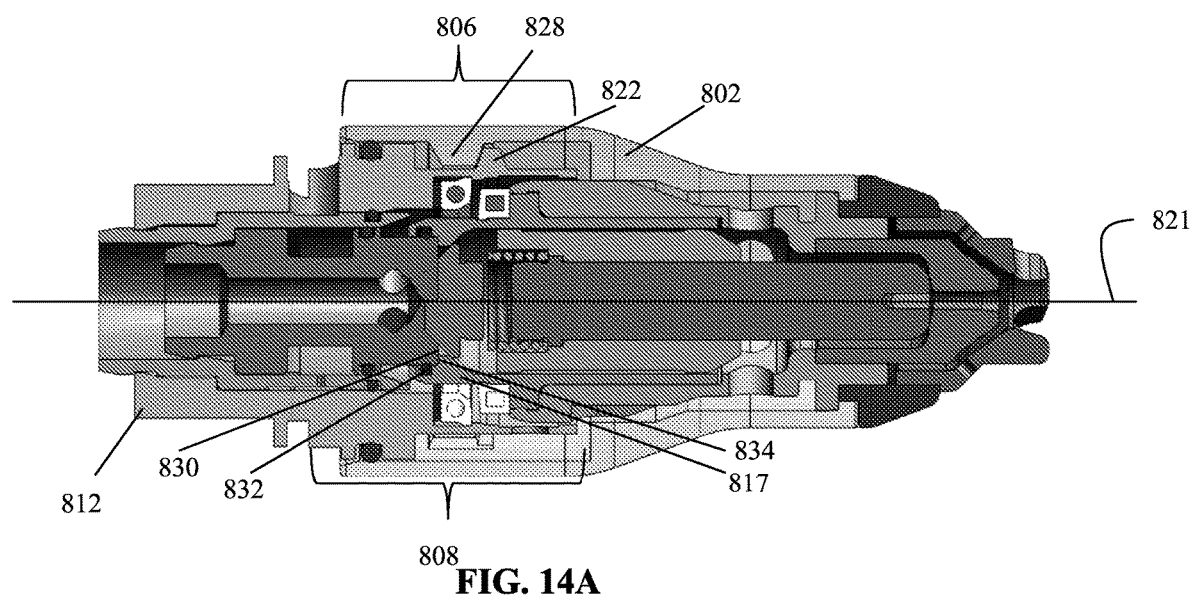
FIGS. 14A and B illustrate various views of the connector assembly of FIGS. 10A and B in the locked position, according to some embodiments of the present invention.
Figure 14B:
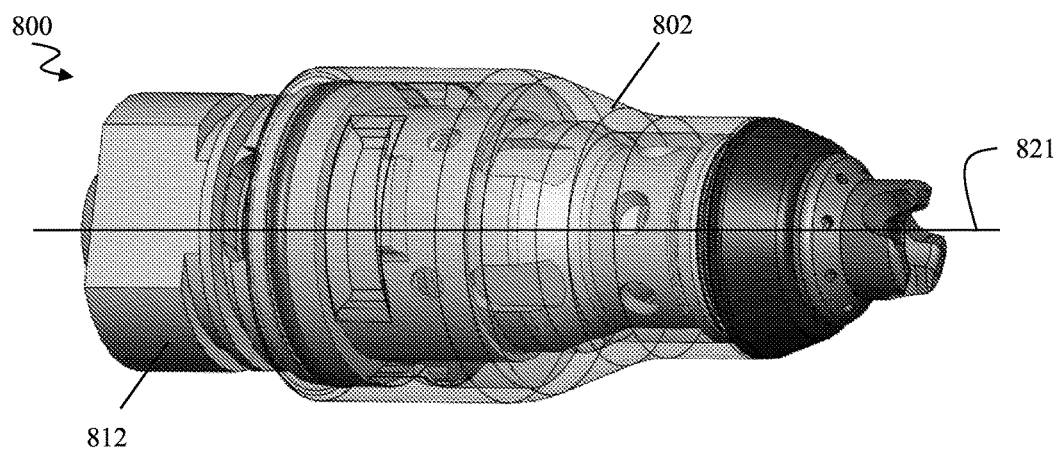

Once the contact position is reached, one connector component is rotatable in relation to the other connector component in a direction (i.e., clock-wise or counter-clock-wise) by a number of degrees less than 360° before the components are secured to each other to reach the locked position. In addition, the rotational movement can involve further axial advancement of the male connector component 808 within the female connector component 806 to minimize the gap between the shoulder 830 and the contact surface 834. FIGS. 14A and B illustrate various views of the connector assembly of FIGS. 10A and B in the locked position, according to some embodiments of the present invention. As shown, the locked position is reached when the shoulder 830 of the torch body 812 rotates past the o-ring 832 and encounters the contact surface 834 of the electrode cylinder 817 or the nozzle body 850. In the locked position, the male thread 822 of each thread region 820 of the male connector component 808 locks into place with the corresponding female thread 828 of a thread region 824 of the female connector component 806. If there are three thread regions on each connector component, a rotation of about 60° is needed to achieve the locked position.

Figure 15:
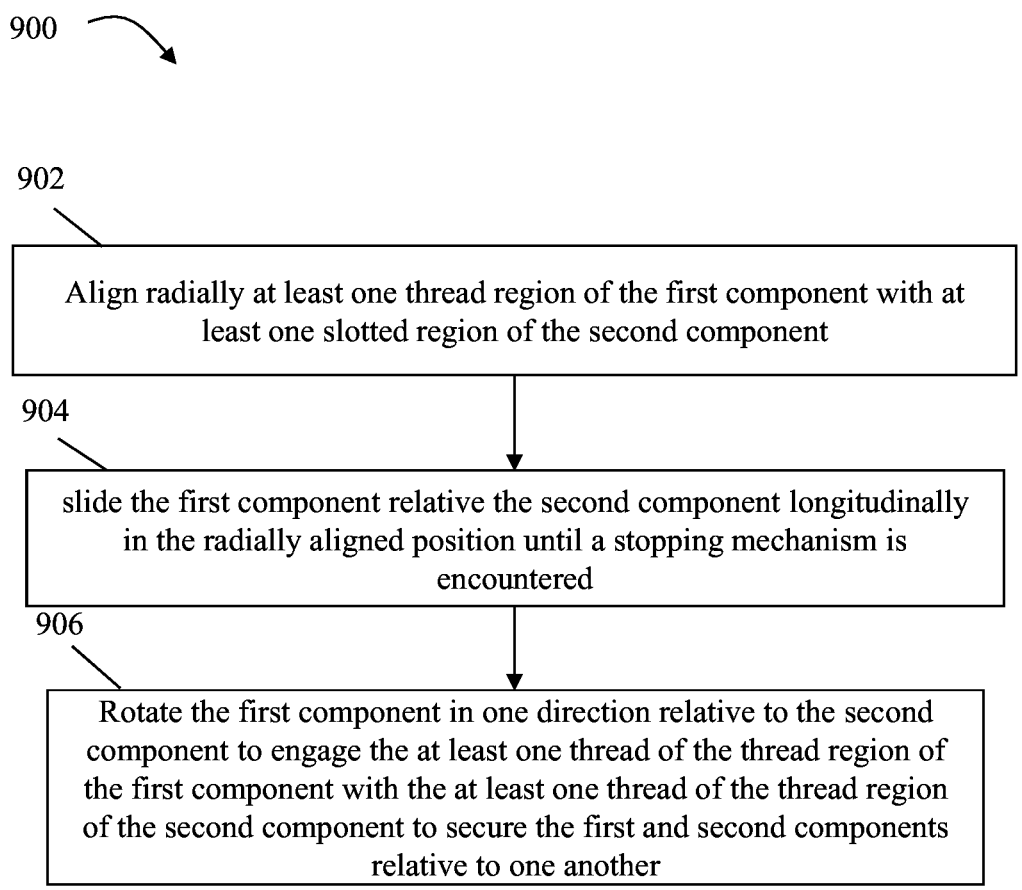
FIG. 15 illustrates a method for securing one connector component to another connector component, according to some embodiments of the present invention.

FIG. 15 illustrates a general method 900 for securing one connector component (a "first component") to another connector component (a "second component"), such as the male connector component 102 to the female connector component 120 of FIG. 1, the male connector component 350 to the female connector component 356 of FIGS. 4A and B, the male connector component 600 of FIG. 6 to a complementary female component (not shown), the male connector component 702 to the female connector component 720 of FIG. 7 or the male component 808 to the female component 806 of FIGS. 10A and B. In some embodiments, the first connector component is a male connector component, in which case the second connector component is a female connector component. In some embodiments, the first connector component is a female connector component, in which case the second connector component is a male connector component. The first and second components each has i) at least one thread region with at least one thread and ii) at least one slotted (i.e., smooth) region characterized by the absence of threads or other irregular features.

At step 902, each of the thread regions 112 of the first connector component is radially aligned with a smooth region of the second connector component. Conversely, each of the slotted regions of the first connector component can be radially aligned with a thread region of the second connector component. In some embodiments, the thread regions of both connector components are about identical. That is, the location and orientation of the thread(s) on one thread region are substantially the same as that of a different thread region associated with the same or different components. In addition, the thread regions and slotted regions can be rotationally symmetrical about each of the components.

At step 904, the first connector component is inserted along the longitudinal direction relative to the second connector component while being maintained in the radially aligned orientation. The insertion can be accomplished by sliding the first connector component relative to the second connector component without any rotation to axially abut the two components. In some embodiments, the sliding stops when a stopping mechanism associated with the male connector component (e.g., the flange 118 or the shoulder 830) encounters the stopping mechanism associated with the female connector component (e.g., encounters the stop rim 136 to reach the inserted position or encounters the o-ring 832 to reach the contact position). In some embodiments, the two components are prevented from rotating relative to each other until the inserted or contact position is reached, at which point the threads of the two components are aligned to permit rotation and engagement to reach the locked position. To disengage the components, the first connector component can be rotated relative to the second connector component in an opposite direction by about the same number of degrees as the rotation used during the engagement process, but no further. This is because an edge of a thread region of the first component would encounter an opposing face of a thread region of the second component in the rotational path to prevent over-rotation and accidental engagement in the opposite direction. In some embodiments (e.g., the designs of FIGS. 1-9B), when moving from the inserted position to the locked position during engagement or moving from the locked position to the inserted position during disengagement, the rotation of one component relative to the other component does not allow any axial movement. In other embodiments (e.g., the designs of FIGS. 10A-14B), when moving from the contact position to the locked position during engagement or moving from the locked position to the contact position during disengagement, the rotation of one component relative to the other component is accompanied by some axial movement of one component relative to the other component.

In general, the present invention allows a torch part with a connector component coupled thereto to be positioned in, or close to, its final axial position without rotating either the connector component or the corresponding component. Once the stopping mechanisms of the connector components make contact, each of the torch parts can be rotated to a number of degrees less than 360° to securely engage the parts with a sufficient joint strength and/or current-carrying capacity same as a traditional joint (e.g., a full-threaded joint).

It should also be understood that various aspects and embodiments of the invention can be combined in various ways. Based on the teachings of this specification, a person of ordinary skill in the art can readily determine how to combine these various embodiments.

What is claimed is:

1. A consumable connector component of a consumable of a material processing head for attaching the consumable to a corresponding component of the material processing head, the consumable connector component comprising:
    a cylindrical body including a proximal end and a distal end disposed along a longitudinal axis;
    a plurality of segments disposed radially about the body, each segment including at least one thread disposed on a surface of the body; and
    a plurality of smooth regions disposed radially about the surface of the body near the proximal end, each of the smooth regions radially located between a pair of the segments; and
    wherein the at least one thread of a first segment of the plurality of segments forms a pitch path that is not rotationally continuous with a pitch path formed by the at least one thread of an adjacent segment of the plurality of segments.

2. The consumable connector component of claim 1, wherein at least one of the segments extends radially at least 50 degrees about the surface of the body.

3. The consumable connector component of claim 1, wherein each thread has a helix angle of about 3 degrees.

4. The consumable connector component of claim 1, wherein the consumable connector component is a male consumable component configured to securely engage a female consumable component.

5. The consumable connector component of claim 4, further comprising an axial stop disposed circumferentially about the surface of the cylindrical body between the distal end and the segments, the axial stop configured to contact the female consumable component.

6. The connector component of claim 5, wherein the male consumable component is aligned to the female consumable component via the axial stop prior to rotational engagement of the threads.

7. The consumable connector component of claim 1, wherein the connector component is configured to secure a corresponding component.

8. The consumable connector component of claim 7, wherein at least one of the smooth regions of the consumable connector component is configured to align with at least one of the segments of the corresponding component to facilitate slidable insertion of one component into the other component.

9. The consumable connector component of claim 7, wherein one component is rotatable in relation to the other component in a first direction by a number of degrees less than 180 degrees to secure the other component.

10. The consumable connector component of claim 9, wherein the components are disengaged when one component is rotated in relation to the other component in a second direction opposite from the first direction by about the same number of degrees.

11. The consumable connector component of claim 1, wherein the segments are disposed radially about the body in a rotationally symmetrical arrangement.

12. The consumable connector component of claim 1, wherein the at least one thread of each segment extends radially about the body.

13. The consumable connector component of claim 1, wherein the consumable connector component is coupled to a consumable comprising one of an electrode, a cartridge, a nozzle, or a retaining cap.

14. The consumable connector component of claim 1, wherein the proximal end extends to about half of the longitudinal length of the connector component.

15. A connector component configured for assembly into a material processing head, the connector component comprising:
    a generally cylindrical body including a proximal end and a distal end defining a longitudinal axis;
    at least one thread region disposed at a radial location on a surface of the body near the proximal end, wherein each thread region includes at least one thread element disposed on the surface of the body, the at least one thread element forms a discontinuous rotational pitch path about the longitudinal axis; and
    at least one non-threaded region disposed at a radial location on the surface of the body, wherein each non-threaded region is radially adjacent to a thread region.

16. The connector component of claim 15, wherein the thread element extends radially at least 50 degrees about the surface of the body.

17. The connector component of claim 15, wherein the thread element has a substantially flat circumferential surface.

18. The connector component of claim 15, wherein the thread element is angled about 3 degrees in relation to a circumferential axis of the body orthogonal to the longitudinal axis.

19. The connector component of claim 15, wherein at least one circumferential end of the thread element comprises an arcuate shape that is configured to engage a complementary thread element of another connector component.

20. A method for engaging the connector component of claim 15 and a second component for the material processing head, the components each having i) at least one thread region having at least one thread and ii) at least one non-threaded region characterized by the absence of threads, the method comprising:
    aligning the at least one thread region of the connector component with the at least one non-threaded region of the second component;
    sliding the connector component relative to the second component longitudinally in the aligned position;
    axially abutting the connector component and the second component; and
    rotating the connector component in one direction relative to the second component to engage the at least one thread of the thread region of the connector component with the at least one thread of the thread region of the second component to secure the connector component and the second component relative to one another.

21. The method of claim 20, further comprising:
    preventing the connector component from rotating with respect to the second component during the sliding;
    engaging a gap of the connector component with a rim of the second component; and
    rotating the connector component relative to the second component in one direction after the engaging.

22. The method of claim 20, wherein rotating the connector component relative to the second component comprises rotating the connector component by a number of degrees less than 360°.

23. The method of claim 20, wherein the at least one thread region of the connector component comprises a set of two opposite thread regions of the connector component and the at least one non-threaded region of the second component comprises a set of two opposite non-threaded regions of the second component.

24. The method of claim 22, further comprising rotating the connector component relative to the second component in an opposite direction by about the same number of degrees to disengage the two components.

25. The method of claim 24, wherein the connector component is prevented from rotating further in the opposite direction when a face of a thread region of the connector component encounters an opposing face of a thread region of the second component in the rotational path.

26. The method of claim 20, wherein at least one of the connector component or the second component is coupled to a consumable of the plasma arc torch.

27. The method of claim 20, further comprising forming a seal between the connector component and the second component.

28. The method of claim 20, wherein the axially abutting the connector component and the second component comprises at least one of:
    contacting a rim of the second component with a flange of the connector component to limit further relative axial of the connector component and the second component; or
    contacting a seal of the second component with the connector component.

29. A connector component configured for assembly into a torch, the connector component comprising:
    a body including a proximal end and a distal end disposed along a longitudinal axis;
    at least two thread regions disposed radially about the longitudinal axis on a surface of the body near the proximal end, wherein each thread region includes at least one thread disposed on the surface of the body; and
    at least two smooth regions each disposed radially about the longitudinal axis between a pair of thread regions on the surface of the body,
    wherein the at least one thread in a first thread region of the at least two thread regions is physically and orientationally separate from the at least one thread of an adjacent thread region of the at least two thread regions, such that a thread pitch path of the at least one thread in the first thread region is discontinuous from a thread pitch path of the at least one thread of the adjacent thread region.

30. The connector component of claim 29, wherein the connector component comprises a male component configured to securely engage a female component.

31. The connector component of claim 30, wherein the male component includes a gap disposed at the distal end of the body, the gap being configured to prevent rotation of the male component in the female component unless the gap is aligned with a corresponding rim of the female component.

32. The connector component of claim 29, wherein the connector component comprises a female component configured to securely engage a male component.

33. The connector component of claim 32, wherein the female component includes a rim disposed on the distal end of the body, the rim being configured to prevent rotation of the male component in the female component unless the rim is aligned with a corresponding gap of the male component.

34. The connector component of claim 29, wherein the connector component consists of two thread regions.

35. The connector component of claim 29, wherein the connector component is configured to secure a corresponding component.

36. The connector component of claim 35, wherein at least one of the smooth regions of the connector component is configured to align with at least one of the thread regions of the corresponding component to facilitate slidable displacement of one component into the other component.

37. The connector component of claim 35, wherein one component is rotatable in relation to the other component in a first direction by a number of degrees less than 360° to secure the other component.

38. The connector component of claim 35, wherein the number of degrees comprises one of less than or equal to about 60°, 90°, or 180°.

39. The connector component of claim 35, wherein the components are disengaged when one component is rotated in relation to the other component in a second direction opposite from the first direction by about the same number of degrees.

40. The connector component of claim 29, wherein the at least one thread of the first thread region has a pitch that is discontinuous from a pitch of the at least one thread of the adjacent thread region such that the threads of different thread regions are formed along different helical paths.

41. The connector component of claim 29, wherein the connector component is coupled to a consumable of the plasma arc torch for attaching the consumable to another element of the plasma arc torch.

42. The connector component of claim 41, wherein the consumable comprises one of an electrode, nozzle, retaining cap, shield or torch.

43. The connector component of claim 29, wherein the location and orientation of the at least one thread on one thread region is substantially the same as that of another thread region.

44. The connector component of claim 29, wherein the at least two thread regions are disposed radially about the body in a rotationally symmetrical arrangement.

45. The connector component of claim 29, wherein the at least two smooth regions are disposed radially about the body in a rotationally symmetrical arrangement.

46. A consumable electrode component of a plasma arc troch configured for attaching to another component of the plasma arc torch, the consumable electrode component comprising:
  a cylindrical body including a proximal end and a distal end disposed along a longitudinal axis;
  at least two thread regions disposed radially about the longitudinally axis on a surface of the body near the proximal end, wherein each thread region includes at least one thread disposed on the surface of the body;
  at least two smooth regions disposed radially about the surface of the body about the proximal end, each smooth region disposed between a pair of the thread regions
  wherein a pitch of the at least one thread in a first thread region of the at least two thread regions does not create a continuous rotational path with a pitch of the at least one thread of an adjacent thread region of the at least two thread regions.

47. The consumable electrode component of claim 46, further comprising at least one of:
  an axial stop flange disposed circumferentially about the surface of the cylindrical body between the distal end and the thread regions, the axial stop configured to contact the female consumable component; and
  an o-ring seal disposed about the body between the proximal end and the axial stop flange.

48. The consumable electrode component of claim 46, wherein each of the two thread regions is characterized by at least one of: i) extend less than about 90 degrees along the surface of the body; or ii) each of the threads having circumferential ends defining a rounded contour.

* * * * *